United States Patent
Nimbalker

(10) Patent No.: US 11,765,722 B2
(45) Date of Patent: Sep. 19, 2023

(54) CORRECTIONS TO LIMITED BUFFER RATE-MATCHING RESTRICTION

(71) Applicant: Telefonaktiebolaget LM Ericsson (publ), Stockholm (SE)

(72) Inventor: Ajit Nimbalker, Fremont, CA (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 173 days.

(21) Appl. No.: 17/429,741

(22) PCT Filed: Feb. 12, 2020

(86) PCT No.: PCT/EP2020/053602
§ 371 (c)(1),
(2) Date: Aug. 10, 2021

(87) PCT Pub. No.: WO2020/165251
PCT Pub. Date: Aug. 20, 2020

(65) Prior Publication Data
US 2022/0104232 A1   Mar. 31, 2022

Related U.S. Application Data

(60) Provisional application No. 62/806,325, filed on Feb. 15, 2019.

(51) Int. Cl.
*H04W 72/08* (2009.01)
*H04W 72/1273* (2023.01)
(Continued)

(52) U.S. Cl.
CPC ....... *H04W 72/1273* (2013.01); *H04L 1/0067* (2013.01); *H04L 27/2607* (2013.01); *H04L 27/26025* (2021.01); *H04W 72/044* (2013.01)

(58) Field of Classification Search
CPC ........... H01M 2220/20; H01M 50/112; H01M 50/184; H01M 50/209; H01M 50/249;
(Continued)

(56) References Cited

U.S. PATENT DOCUMENTS

2009/0199062 A1   8/2009   Shen et al.
2014/0198758 A1   7/2014   Nimbalker et al.
(Continued)

FOREIGN PATENT DOCUMENTS

RU   2656688 C2   6/2018
WO   2018161847 A1   9/2018

OTHER PUBLICATIONS

3GPP, "3GPP TS 38.212 V15.4.0", 3rd Generation Partnership Project; Technical Specification Group Radio Access Network; NR; Multiplexing and channel coding (Release 15), Dec. 2018, 1-100.
(Continued)

*Primary Examiner* — Phuc H Tran
(74) *Attorney, Agent, or Firm* — Murphy, Bilak & Homiller, PLLC

(57) ABSTRACT

Embodiments include methods, performed by a user equipment (UE), for receiving downlink (DL) data from a serving cell in a wireless network. Such methods include determining whether a total number of coded bits for all transport blocks (TBs) scheduled for the UE, by the wireless network in the serving cell during a plurality of consecutive symbols, is greater than a limited-buffer rate-matching (LBRM) threshold. The LBRM threshold is based on a maximum number of transmission layers, X, associated with the UE for the serving cell. Such methods also include receiving and
(Continued)

```
┌─────────────────────────────────────────────────────────────────────┐
│ Determining whether a total number of coded bits for all transport  │
│ blocks (TBs) scheduled for the UE, by the wireless network in the   │ 1110
│ serving cell during a plurality of consecutive symbols, is greater  │
│ than a limited-buffer rate-matching (LBRM) threshold.               │
└─────────────────────────────────────────────────────────────────────┘
                                  │
                                  ▼
┌─────────────────────────────────────────────────────────────────────┐
│ Receiving and decoding a plurality of TBs, comprising one or more   │
│ DL data messages, when the total number of coded bits for all TBs,  │ 1120
│ including the plurality of TBs, is not greater than the LBRM        │
│ threshold.                                                          │
│  ┌───────────────────────────────────────────────────────────────┐  │
│  │ Receiving a first TB via one or more first transmission layers.│ 1122
│  └───────────────────────────────────────────────────────────────┘  │
│  ┌───────────────────────────────────────────────────────────────┐  │
│  │ Receiving a second TB via one or more second transmission layers. │ 1124
│  └───────────────────────────────────────────────────────────────┘  │
│  ┌───────────────────────────────────────────────────────────────┐  │
│  │       Decoding the respective first and second TBs.           │ 1126
│  └───────────────────────────────────────────────────────────────┘  │
└─────────────────────────────────────────────────────────────────────┘
                                  │
                                  ▼
┌─────────────────────────────────────────────────────────────────────┐
│ Refraining from receiving and decoding the plurality of TBs when    │
│ the total number of coded bits for all TBs is greater than the      │ 1130
│ LBRM threshold.                                                     │
└─────────────────────────────────────────────────────────────────────┘
``` decoding a plurality of TBs, comprising one or more DL data messages, when the total number of coded bits for all TBs (including the plurality of TBs) scheduled for the UE is not greater than the LBRM threshold. Other embodiments include complementary methods performed by network nodes, and UEs and network nodes configured to perform such methods.

21 Claims, 9 Drawing Sheets

(51) Int. Cl.
  *H04L 27/26* (2006.01)
  *H04L 1/00* (2006.01)
  *H04W 72/044* (2023.01)

(58) Field of Classification Search
  CPC .. H01M 50/298; H01M 50/503; H01M 50/51; H01M 50/519; H01M 50/569; H04W 72/044; H04W 72/1273; H04L 1/0041; H04L 1/0045; H04L 1/0067; H04L 1/1854; H04L 1/1864; H04L 27/26025; H04L 27/2607
  See application file for complete search history.

(56) References Cited

U.S. PATENT DOCUMENTS

| | | | |
|---|---|---|---|
| 2015/0103752 A1 | 4/2015 | Yu et al. | |
| 2019/0141647 A1* | 5/2019 | Nimbalker | H04W 4/40 |
| 2019/0223160 A1* | 7/2019 | He | H04W 68/005 |
| 2020/0112965 A1* | 4/2020 | Kim | H04L 27/26025 |

OTHER PUBLICATIONS

3GPP, "3rd Generation Partnership Project; Technical Specification Group Radio Access Network; NR; Physical layer procedures for data (Release 15)3GPP TS 38.214 V15.4.0", 3GPP TS 38.214 V15.4.0, Dec. 2018, 1-102.

3GPP, "3GPP TS 38.211 V15.4.0", 3rd Generation Partnership Project; Technical Specification Group Radio Access Network; NR; Physical channels and modulation (Release 15), Dec. 2018, 1-96.

3GPP, "3rd Generation Partnership Project; Technical Specification Group Radio Access Network; NG-RAN Architecture description (Release 15", 3GPP TS 38.401 V15.4.0, Dec. 2018, 1-40.

3Gpp, "3rd Generation Partnership Project; Technical Specification Group Radio Access Network; Study on new radio access technology: Radio access architecture and interfaces (Release 14)", 3GPP TR 38.801 V14.0 0, Mar. 2017, 1-91.

3Gpp, "ETSI TS 138 212 V15.3.0", 5G; NR; Multiplexing and channel coding (3GPP TS 38.212 version 15.3.0 Release 15), Oct. 2018, 1-102.

3Gpp, "ETSI TS 138 214 V15.3.0", 5G; NR; Physical layer procedures for data (3GPP TS 38.214 version 15.3.0 Release 15), Oct. 2018, 1-99.

3Gpp, "ETSI TS 138 214 V15.5.0", 5G; NR; Physical layer procedures for data (3GPP TS 38.214 version 15.5.0 Release 15), May 2019, 1-105.

"Correction to LBRM restriction", 3GPP TSG-RAN WG1 Meeting #96, R1-1902571, Ericsson, Athens, Greece, Feb. 25-Mar. 1, 2019, 10 pages.

"Maintenance for DL/UL data scheduling and HARQ procedure", 3GPP TSG-RAN WG1 Meeting #94, R1-1809428, Qualcomm Incorporated, Gothenburg, Sweden, Aug. 20-24, 2018, 12 pages.

"Summary of Soft buffer and Peak rate", 3GPP TSG-RAN WG1 Meeting #94B, R1-1812063, Ericsson, Chengdu, Oct. 8-12, 2018, 7 pages.

* cited by examiner

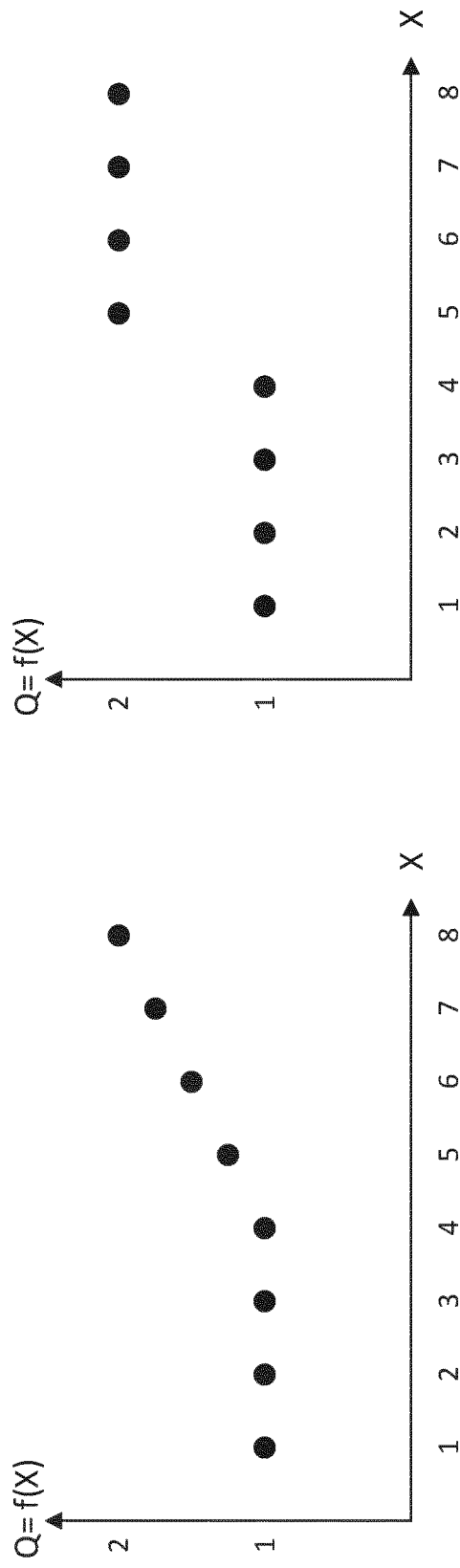

CORRECTIONS TO LIMITED BUFFER RATE-MATCHING RESTRICTION

TECHNICAL FIELD

Embodiments of the present disclosure generally relates to wireless communication networks, and particularly relates to improving transmission and/or reception of data in wireless communication networks.

BACKGROUND

Currently the fifth generation ("5G") of cellular systems, also referred to as New Radio (NR), is being standardized within the Third-Generation Partnership Project (3GPP). NR is developed for enhanced flexibility to support multiple and varied use cases. Besides the typical mobile broadband use case, NR can provide service for machine type communication (MTC), ultra-reliable low-latency communications (URLLC), side-link device-to-device (D2D), and several other use cases too. The present disclosure relates generally to NR, but the following description of previous-generation technology is provided for context since it shares many features with NR.

Long-Term Evolution (LTE is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases that are developed according to standards-setting processes with 3GPP and its working groups (WGs), including the Radio Access Network (RAN) WG, and sub-working groups (e.g., RAN1, RAN2, etc.).

LTE Release 10 (Rel-10) supports bandwidths larger than 20 MHz. One important requirement on Rel-10 is to assure backward compatibility with LTE Release-8. As such, a wideband LTE Rel-10 carrier (e.g., wider than 20 MHz) should appear as a number of carriers to an LTE Rel-8 ("legacy") terminal. Each such carrier can be referred to as a Component Carrier (CC). For an efficient use of a wide carrier also for legacy terminals, legacy terminals can be scheduled in all parts of the wideband LTE Rel-10 carrier. One exemplary way to achieve this is by means of Carrier Aggregation (CA), whereby a Rel-10 terminal can receive multiple CCs, each preferably having the same structure as a Rel-8 carrier. One of the enhancements in LTE Rel-11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel. Furthermore, LTE Rel-12 introduced dual connectivity (DC) whereby a UE can be connected to two network nodes simultaneously, thereby improving connection robustness and/or capacity.

An overall exemplary architecture of a network comprising LTE and SAE is shown in FIG. 1. E-UTRAN 100 comprises one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third- ("3G") and second-generation ("2G") 3GPP radio access networks are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC, and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations.

In some embodiments, HSS 131 can communicate with a user data repository (UDR)—labelled EPC-UDR 135 in FIG. 1—via a Ud interface. The EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2A shows a high-level block diagram of an exemplary LTE architecture in terms of its constituent entities—UE, E-UTRAN, and EPC—and high-level functional division into the Access Stratum (AS) and the Non-Access Stratum (NAS). FIG. 2A also illustrates two particular interface points, namely Uu (UE/E-UTRAN Radio Interface) and 51 (E-UTRAN/EPC interface), each using a specific set of protocols, i.e., Radio Protocols and 51 Protocols. Although not shown in FIG. 2A, each of the protocol sets can be further segmented into user plane and control plane protocol functionality. The user and control planes are also referred to as U-plane and C-plane, respectively. On the Uu interface, the U-plane carries user information (e.g., data packets) while the C-plane carries control information between UE and E-UTRAN.

FIG. 2B illustrates a block diagram of an exemplary C-plane protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression. The exemplary protocol stack also includes non-access stratum (NAS) signaling between the UE and the MME.

FIG. 2C shows a block diagram of an exemplary LTE radio interface protocol architecture from the perspective of the PHY layer. The interfaces between the various layers are provided by Service Access Points (SAPs), indicated by the ovals in FIG. 2C. The PHY layer interfaces with the MAC and RRC protocol layers described above. The PHY, MAC, and RRC are also referred to as Layers 1-3, respectively, in the figure. The MAC provides different logical channels to the RLC protocol layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity; and beamforming multiple input multiple output (MIMO) antenna processing. The PHY layer also receives control information (e.g., commands) from RRC and provides various information to RRC, such as radio measurements.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "On durations"), an RRC_IDLE UE receives system information (SI) broadcast by a serving cell, performs measurements of neighbor cells to support cell reselection, and monitors a paging channel on PDCCH for pages from the EPC via eNB. An RRC_IDLE UE is known in the EPC and has an assigned IP address, but is not known to the serving eNB (e.g., there is no stored context).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PBCH carries the basic system information, required by the UE to access the network. PDSCH is the main physical channel used for unicast DL data transmission, but also for transmission of RAR (random access response), certain system information blocks, and paging information. PHICH carries HARQ feedback (e.g., ACK/NAK) for UL transmissions by the UEs. Similarly, PDCCH carries DL scheduling assignments (e.g., for PDSCH), UL resource grants (e.g., for PUSCH), channel quality feedback (e.g., CSI) for the UL channel, and other control information.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel.

PRACH is used for random access preamble transmission. PUSCH is the counterpart of PDSCH, used primarily for unicast UL data transmission. Similar to PDCCH, PUCCH carries uplink control information (UCI) such as scheduling requests, CSI for the DL channel, HARQ feedback for eNB DL transmissions, and other control information.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 3A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 3A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}RB$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP Technical Specification (TS) 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 3B shows an exemplary LTE FDD uplink (UL) radio frame configured in a similar manner as the exemplary FDD DL radio frame shown in FIG. 3A. Using terminology consistent with the above DL description, each UL slot consists of $N^{uL}_{symb}$ OFDM symbols, each of which is comprised of $N_{sc}$ OFDM subcarriers.

As discussed above, the LTE PHY maps the various DL and UL physical channels to the resources shown in FIGS. 3A and 3B, respectively. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

The REGs comprising the CCEs of the PDCCH can be mapped into the first three symbols of a subframe, referred to as a "control region," whereas the remaining symbols are available for other physical channels, such as the PDSCH which carries user data. Each of the REGs comprises four REs. The number of CCEs may vary depending on the required PDCCH capacity, which is based on number of users, amount of measurements, and/or control signaling, etc. On the uplink, PUCCH can be configured similarly.

In LTE, DL transmissions are dynamically scheduled, i.e., in each subframe the base station transmits control information indicating the terminal to which data is transmitted and upon which resource blocks the data is transmitted, in the current downlink subframe. This control signaling is typically transmitted in the first n OFDM symbols in each subframe and the number n (=1, 2, 3 or 4) is known as the Control Format Indicator (CFI), which is indicated by the PCFICH transmitted in the first symbol of the control region.

NR shares many of the features of LTE that were discussed above. One difference from LTE is that NR packet transmission durations, processing times, and transmission bandwidths are much more flexible. Although this flexibility facilitates the many different services envisioned for NR, it can also create some difficulties with available resources in the UE. For example, there is a risk that a UE's peak packet decoding throughput (e.g., for PDSCH) can be exceeded for a given NR DL configuration. Existing techniques to address such problems are inefficient and can lead to UE and/or network performance degradation.

SUMMARY

Embodiments of the present disclosure can provide specific improvements to communication between user equipment (UE) and network nodes in a wireless communication network, such as by facilitating solutions to overcome the exemplary problems described above and explained in more detail below.

Some exemplary embodiments of the present disclosure include methods (e.g., procedures) for receiving downlink (DL) data from a serving cell in a wireless network. These exemplary methods can be performed by a user equipment (UE, e.g., wireless device, IoT device, modem, etc. or component thereof) operating in a cell of a wireless network (e.g., E-UTRAN, NG-RAN).

These exemplary methods can include determining whether a total number of coded bits for all transport blocks (TBs) scheduled for the UE, by the wireless network in the serving cell during a plurality of consecutive symbols, is greater than a limited-buffer rate-matching (LBRM) threshold. The LBRM threshold can be based on a maximum number of transmission layers (X) associated with the UE for the serving cell.

In some embodiments, X can be greater than four (4). In some embodiments, X can be given and/or determined by the following parameters:
- a higher-layer parameter maxMIMO-Layers of the serving cell, when the higher-layer parameter has been configured for the UE by the wireless network; and
- the maximum number of layers for physical downlink shared channel (PDSCH) supported by the UE for the serving cell, when the higher-layer parameter has not been configured for the UE by the wireless network.

These exemplary methods can also include receiving and decoding a plurality of TBs, comprising one or more DL data messages, when the total number of coded bits for all TBs scheduled for the UE (i.e., during the consecutive symbols, including the plurality of TBs) is not greater than the LBRM threshold. In some embodiments, the plurality of TBs, comprising to the one or more DL data messages, constitute all TBs scheduled for the UE by the wireless network in the serving cell during the plurality of consecutive symbols.

In some embodiments, the receiving and decoding operations can include receiving a first TB via one or more first transmission layers, receiving a second TB via one or more second transmission layers, and decoding the respective first and second TBs.

In some embodiments, these exemplary methods can also include refraining from receiving and decoding the plurality of TBs when the total number of coded bits for all TBs is greater than the LBRM threshold. For example, the UE can ignore the plurality of TBs when they cumulatively (i.e., together with any other TBs scheduled during the consecutive symbols) exceed the LBRM threshold.

In some embodiments, the LBRM threshold can be determined according to the relation $$Q \cdot \frac{1}{R_{LMRM}} \cdot TBS_{LBRM},$$

where Q is determined based on ceil(X/4), $R_{LBRM}$ is an LBRM code rate, and $TBS_{LBRM}$ is an LBRM transport block size. In some embodiments, Q=ceil(X/4). In some embodiments, Q can be determined based on a lookup table relating a plurality of values of X to respective values of Q. Such a lookup table can represent various functions, including but not limited to ceil(X/4). In some embodiments, the plurality of TBs can be received and decoded based on $R_{LBRM}$ and $TBS_{LBRM}$.

In some embodiments, the total number of coded bits for all TBs scheduled for the UE, by the wireless network in the serving cell during the plurality of consecutive symbols, can be determined according to:

$$2^{max(0,\mu-\mu')} \cdot \sum_{i \in S} \left\lfloor \frac{C_i'}{L_i} \right\rfloor x_i \cdot F_i$$

wherein:
S is a set of all TBs scheduled for the UE on physical data channels that are at least partially included in the plurality of consecutive symbols, and i is an index to an i-th TB within S;
$C_i'$ is a number of scheduled code blocks for the i-th TB;
$L_i$ is a number of orthogonal frequency-division multiplexing (OFDM) symbols assigned to physical data channel for the i-th TB;
$x_i$ is a number of OFDM symbols of a physical data channel that are included in the plurality of consecutive symbols;
$F_i$ is a factor related to a position of the i-th TB in a circular buffer of the UE; and
$\mu-\mu'$ is a difference between numerologies of the UE's active bandwidth part (BWP) and the UE's configured BWP having the largest number of configured physical resource blocks (PRBs) or the largest subcarrier spacing.

Other exemplary embodiments include methods (e.g., procedures) for DL data transmission to a user equipment (UE) in a cell of a wireless network. These exemplary methods can be performed by a network node (e.g., base station, eNB, gNB, en-gNB, ng-eNB, etc., or component thereof) serving the cell in the wireless network (e.g., E-UTRAN, NG-RAN).

These exemplary methods can include determining a limited-buffer rate-matching (LBRM) threshold for the UE based on a maximum number of transmission layers, X, associated with the UE for the serving cell. In some embodiments, X can be greater than four (4). In some embodiments, X can be given and/or determined by the following parameters:
 a higher-layer parameter maxMIMO-Layers of the serving cell, when the higher-layer parameter has been configured for the UE by the wireless network; and
 the maximum number of layers for physical downlink shared channel (PDSCH) supported by the UE for the serving cell, when the higher-layer parameter has not been configured for the UE by the wireless network.

These exemplary methods can also include encoding and transmitting, to the UE, a plurality of transport blocks (TBs) comprising one or more DL data messages such that a total number of coded bits for all TBs scheduled for the UE, in the serving cell during a plurality of consecutive symbols, is not greater than the LBRM threshold. The total number of coded bits includes coded bits for the plurality of TBs. In some embodiments, the plurality of TBs, comprising the one or more DL data messages, constitute all TBs scheduled for the UE in the serving cell during the plurality of consecutive symbols.

In some embodiments, the encoding and transmitting operations can include determining sizes of the plurality of TBs such that the total number of coded bits for all TBs (i.e., scheduled for the UE during the consecutive symbols) is not greater than the LBRM threshold. In some embodiments, the encoding and transmitting operations can include encoding and transmitting a first TB via one or more first transmission layers, and encoding and transmitting a second TB via one or more second transmission layers.

In some embodiments, the LBRM threshold can be determined according to the relation $$Q \cdot \frac{1}{R_{LMRM}} \cdot TBS_{LBRM},$$

where Q is determined based on ceil(X/4), $R_{LBRM}$ is an LBRM code rate, and $TBS_{LBRM}$ is an LBRM transport block size. In some embodiments, Q=ceil(X/4). In some embodiments, Q can be determined based on a lookup table relating a plurality of values of X to respective values of Q. Such a lookup table can represent various functions, including but not limited to ceil(X/4). In some embodiments, the plurality of TBs can be encoded and transmitted based on $R_{LBRM}$ and $TBS_{LBRM}$.

In some embodiments, the total number of coded bits for all TBs scheduled for the UE, by the wireless network in the serving cell during the plurality of consecutive symbols, can be determined according to:

$$2^{max(0,\mu-\mu')} \cdot \sum_{i \in S} \left\lfloor \frac{C_i'}{L_i} \right\rfloor x_i \cdot F_i$$

wherein:
S is a set of all TBs scheduled for the UE on physical data channels that are at least partially included in the plurality of consecutive symbols, and i is an index to an i-th TB within S;
$C_i'$ is a number of scheduled code blocks for the i-th TB;
$L_i$ is a number of orthogonal frequency-division multiplexing (OFDM) symbols assigned to physical data channel for the i-th TB;
$x_i$ is a number of OFDM symbols of a physical data channel that are included in the plurality of consecutive symbols;
$F_i$ is a factor related to a position of the i-th TB in a circular buffer of the UE; and
$\mu-\mu'$ is a difference between numerologies of the UE's active bandwidth part (BWP) and the UE's configured BWP having the largest number of configured physical resource blocks (PRBs) or the largest subcarrier spacing.

Other exemplary embodiments include user equipment (UEs, e.g., wireless devices, IoT devices, modems, etc. or components thereof) and network nodes (e.g., base stations, eNBs, gNBs, ng-eNBs, en-gNBs, etc. or components thereof) configured to perform operations corresponding to any of these exemplary methods described herein. Other exemplary embodiments include non-transitory, computer-readable media storing program instructions that, when executed by processing circuitry, configure such UEs or network nodes to perform operations corresponding to any of these exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIGS. 7-8 show graphs of two exemplary function relating a maximum number of transmission layers, X, and an LBRM scaling factor, Q, according to various exemplary embodiments of the present disclosure.

FIG. 9 shows an exemplary lookup table and/or function relating Q and X, according to various exemplary embodiments of the present disclosure.

FIG. 10 illustrates an exemplary transmitter-receiver mismatch, according to various exemplary embodiments of the present disclosure.

DETAILED DESCRIPTION

Figure 1:
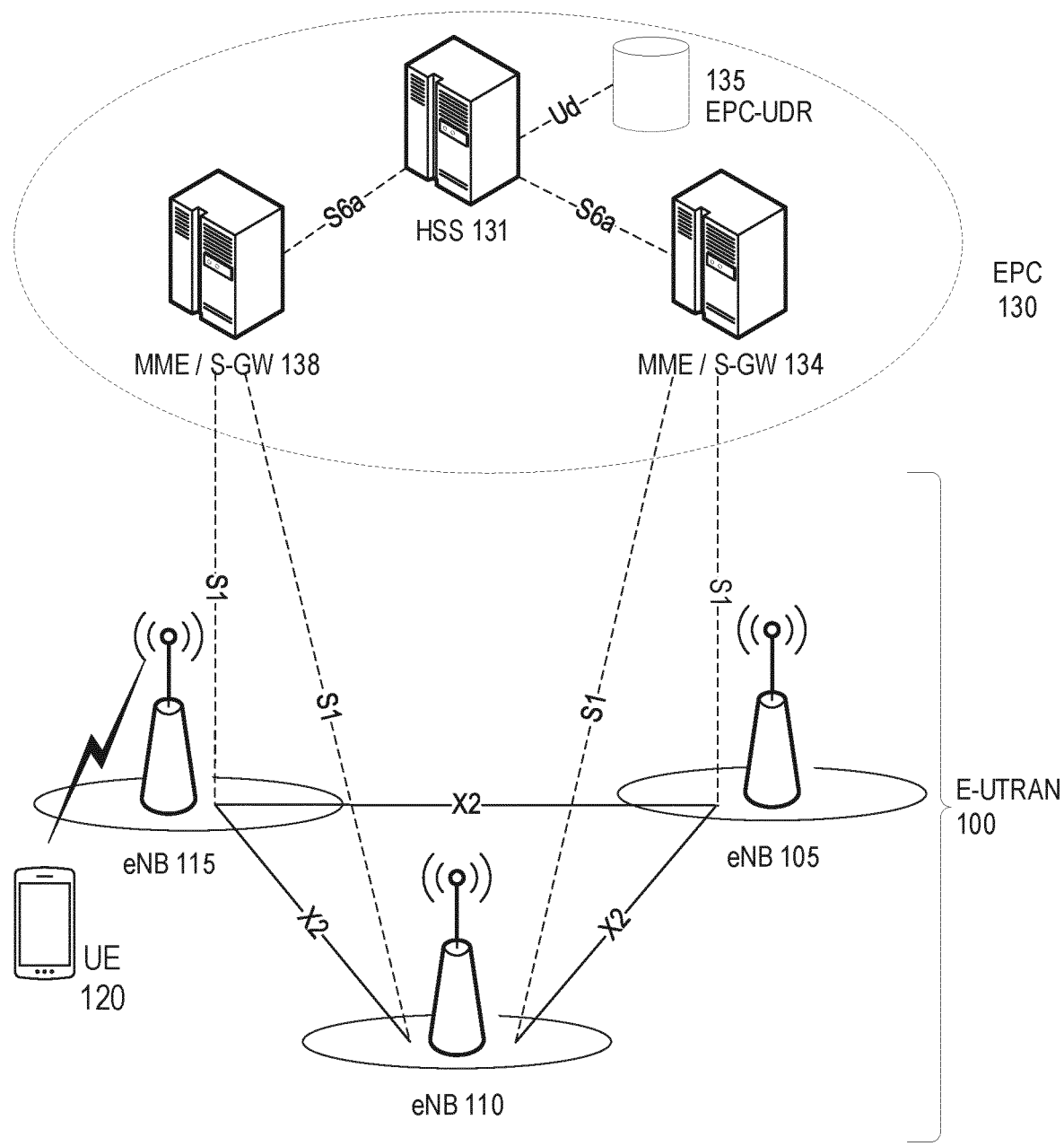
FIG. 1 is a high-level block diagram of an exemplary architecture of the Long-Term Evolution (LTE) Evolved UTRAN (E-UTRAN) and Evolved Packet Core (EPC) network, as standardized by 3GPP.
Figure 2A:
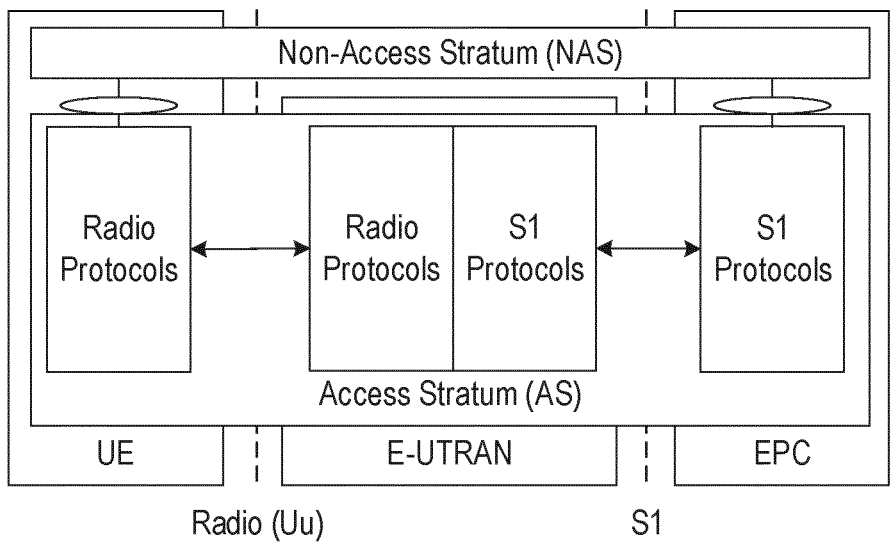
FIG. 2A is a high-level block diagram of an exemplary E-UTRAN architecture in terms of its constituent components, protocols, and interfaces.
Figure 2B:
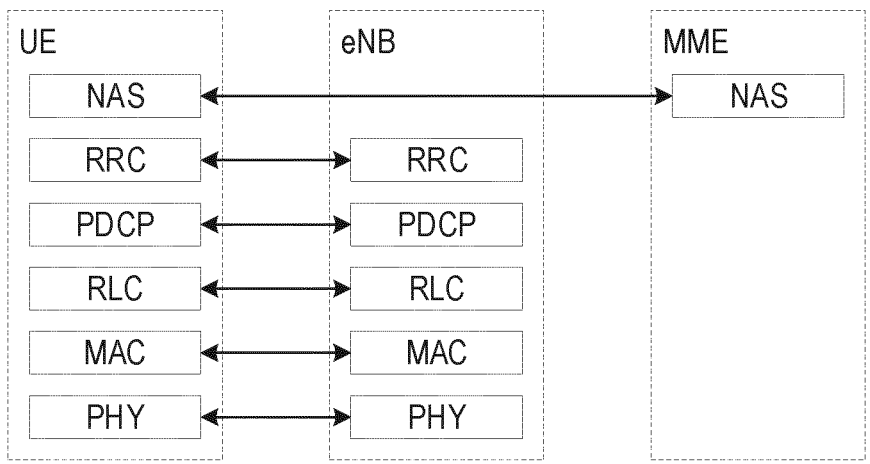
FIG. 2B is a block diagram of exemplary protocol layers of the control-plane portion of the radio (Uu) interface between a user equipment (UE) and the E-UTRAN.
Figure 2C:
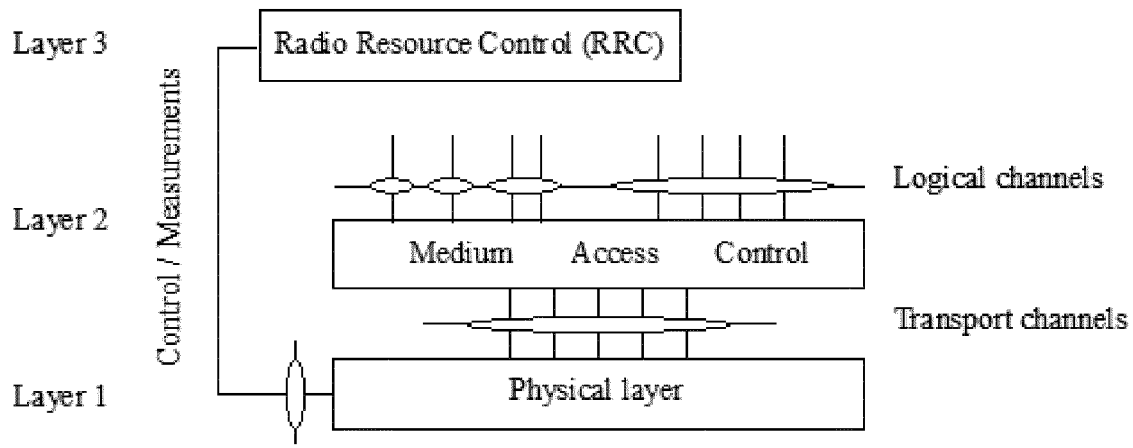
FIG. 2C is a block diagram of an exemplary LTE radio interface protocol architecture from the perspective of the PHY layer.
Figure 3A:
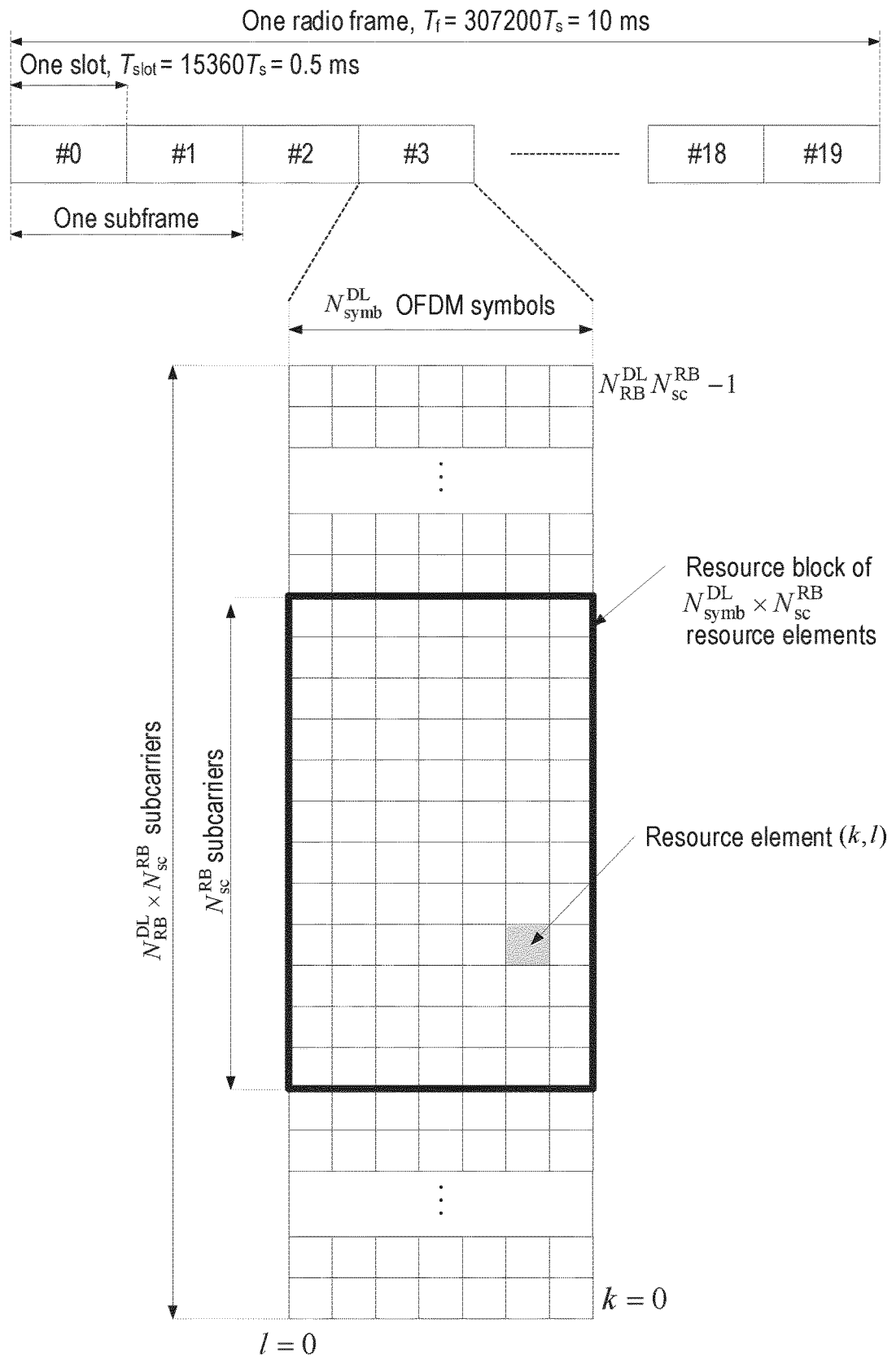
FIGS. 3A and 3B are block diagrams, respectively, of exemplary downlink and uplink LTE radio frame structures used for frequency division duplexing (FDD) operation.
Figure 3B:
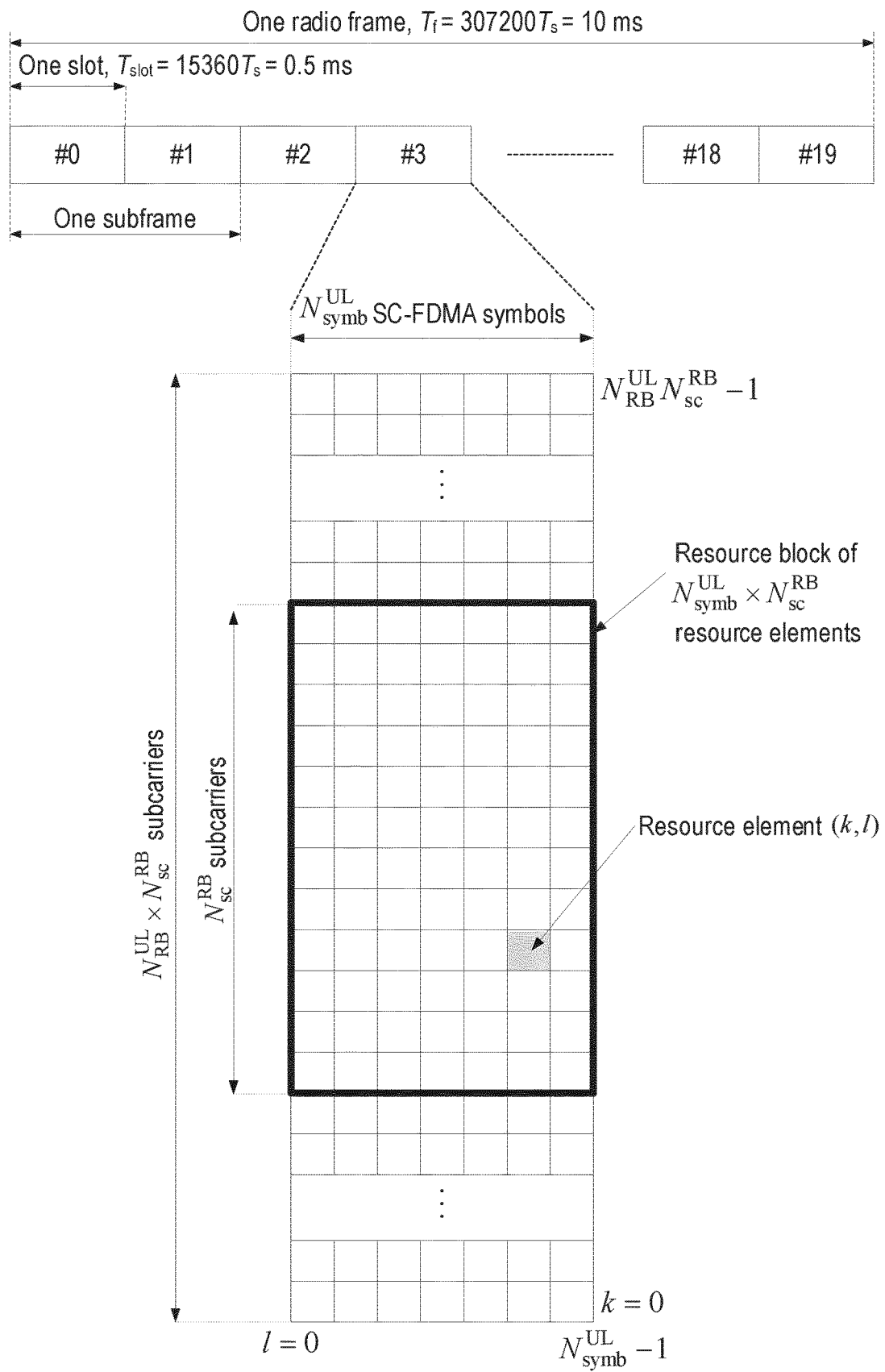

Some of the embodiments briefly summarized above will now be described more fully with reference to the accompanying drawings. These descriptions are provided by way of example to explain the subject matter to those skilled in the art, and should not be construed as limiting the scope of the subject matter to only the embodiments described herein. More specifically, examples are provided below that illustrate the operation of various embodiments according to the advantages discussed above.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

The term "radio node" used herein can be either a "radio access node" or a "wireless device."

The term "radio access node" (or equivalently "radio network node," "radio access network node," or "RAN node") may be used herein to refer to any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), and a relay node.

The term "core network node" may be used herein to refer to any type of node in a core network. Some examples of a core network node might include, but not be limited to e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

The term "wireless device" (or "WD" for short) may be used herein to refer to any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Unless otherwise noted, the term "wireless device" is used interchangeably herein with "user equipment" (or "UE" for short). Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

The term "network node" may used herein to refer to any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

As used herein, a "signal" can be any physical signal or physical channel. Examples of physical signals are reference signal such as primary synchronization signal (PSS), secondary synchronization signal (SSS), channel state information RS (CSI-RS), demodulation RS (DM-RS), signals in SSB, cell reference signal (CRS), positioning reference signal (PRS), sounding reference signal (SRS), etc. The term physical channel used herein is also called as "channel", which contains higher layer information such as logical channel(s), transport channel(s), etc. Examples of physical channels include physical broadcast channel (PBCH), physical SL control channel (PSCCH), physical SL shared channel (PSSCH), physical DL control channel (PDCCH), physical DL shared channel (PDSCH), physical UL shared channel (PUSCH), physical UL control channel (PUCCH), random access channel (RACH), etc.

The term "resource" can be used herein to correspond to any type of physical resource or radio resource expressed in terms of time (e.g., time resources) or frequency (e.g., frequency resources). Examples of time resources include symbol, time slot, subframe, radio frame, TTI, interleaving time, etc.

The term "time-frequency resource" can be used to refer to any radio resource defined in any time-frequency resource grid (e.g., the exemplary NR resource grid shown in FIG. 5) associated with a cell. Examples of time-frequency resource include subcarrier, timeslot, resource block (RB), etc. An RB may also be interchangeably called as physical RB (PRB), virtual RB (VRB), etc.

The term "link" or "radio link" can correspond to a radio transmission path used for cellular operation or for any type of D2D operation between two endpoints (e.g., UEs or wireless devices). Examples of links used for cellular operations are links on Uu interface, uplink/reverse link (UE transmission to BS), downlink/forward link (BS transmission to UE), etc. Examples of links used for D2D operations are links on PCS, sidelink, etc.

As used herein, a "channel" can be a logical, transport, or physical channel (including exemplary physical channels listed above). A channel may comprise and/or be arranged on one or more carriers, in particular a plurality of subcarriers. A channel carrying and/or for carrying control signaling/control information may be considered a control channel (e.g., PDCCH), in particular if it is a physical layer channel and/or if it carries control plane information. Analogously, a channel carrying and/or for carrying data signaling/user information may be considered a data channel (e.g., PDSCH), in particular if it is a physical layer channel and/or if it carries user plane information. A channel may be defined for a specific communication direction, or for two complementary communication directions (e.g., UL and DL, or SL in two directions), in which case it may be considered to have two component channels, one for each direction.

Although terminology from one or more specific wireless systems (e.g., LTE or NR) to may be used herein, this should not limit the scope of the disclosure to only those specific wireless system(s). Other wireless systems, including Wide Band Code Division Multiple Access (WCDMA), Worldwide Interoperability for Microwave Access (WiMax), Ultra Mobile Broadband (UMB), and Global System for Mobile Communications (GSM), may also benefit from principles and/or embodiments of the present disclosure.

As mentioned above, NR packet transmission durations, processing times, and transmission bandwidths are much more flexible as compared to similar parameters for LTE. Although this flexibility facilitates the many different services envisioned for NR, it can also create some difficulties with available resources in the UE. For example, there is a risk that a UE's peak packet decoding throughput (e.g., for PDSCH) can be exceeded for a given NR DL configuration. Existing techniques to address such problems are inefficient and can lead to UE and/or network performance degradation. These issues are discussed in more detail below.

Figure 4:
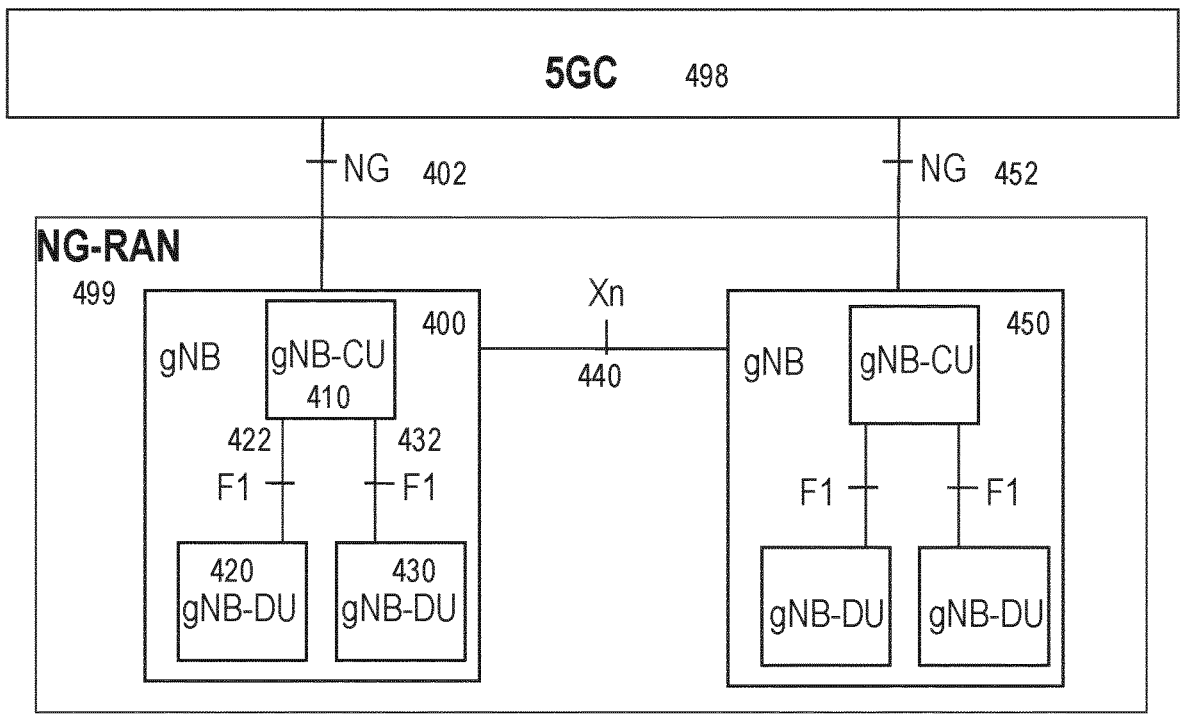
FIG. 4 illustrates a high-level view of a 5G network architecture including an NG-RAN and a 5G Core Network (5GC).

FIG. 4 illustrates a high-level view of the 5G network architecture, consisting of a Next Generation RAN (NG-RAN) 499 and a 5G Core (5GC) 498. NG-RAN 499 can include a set of gNodeB's (gNBs) connected to the 5GC via one or more NG interfaces, such as gNBs 400, 450 connected via interfaces 402, 452, respectively. In addition, the gNBs can be connected to each other via one or more Xn interfaces, such as Xn interface 440 between gNBs 400 and 450. With respect to the NR interface to UEs, each of the gNBs can support frequency division duplexing (FDD), time division duplexing (TDD), or a combination thereof.

The NG RAN logical nodes shown in FIG. 4 (and described in 3GPP TS 38.401 and 3GPP TR 38.801) include a central (or centralized) unit (CU or gNB-CU) and one or more distributed (or decentralized) units (DU or gNB-DU). For example, gNB 400 in FIG. 4 includes gNB-CU 410 and gNB-DUs 420 and 430. CUs (e.g., gNB-CU 410) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 422 and 432 shown in FIG. 4. The gNB-CU and connected gNB-DUs are only visible to other gNBs and the 5GC as a gNB, e.g., the F1 interface is not visible beyond gNB-CU. As briefly mentioned above, a CU can host higher-layer protocols such as, e.g., F1 application part protocol (F1-AP), Stream Control Transmission Protocol (SCTP), GPRS Tunneling Protocol (GTP), Packet Data Convergence Protocol (PDCP), User Datagram Protocol (UDP), Internet Protocol (IP), and Radio Resource Control (RRC) protocol. In contrast, a DU can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

In Rel-15 NR, a UE can be configured with up to four carrier bandwidth parts (BWPs) in the downlink (DL) with a single DL carrier BWP being active at a given time. A UE can also be configured with up to four uplink (UL) carrier BWPs with a single UL carrier BWP being active at a given time. If a UE is configured with a supplementary UL, the UE can be configured with up to four additional carrier BWPs in the supplementary UL, with a single supplementary UL carrier BWP being active at a given time.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1-ms each. A subframe is further divided into multiple slots of equal duration, with each slot including multiple OFDM-based symbols.

Figure 5:
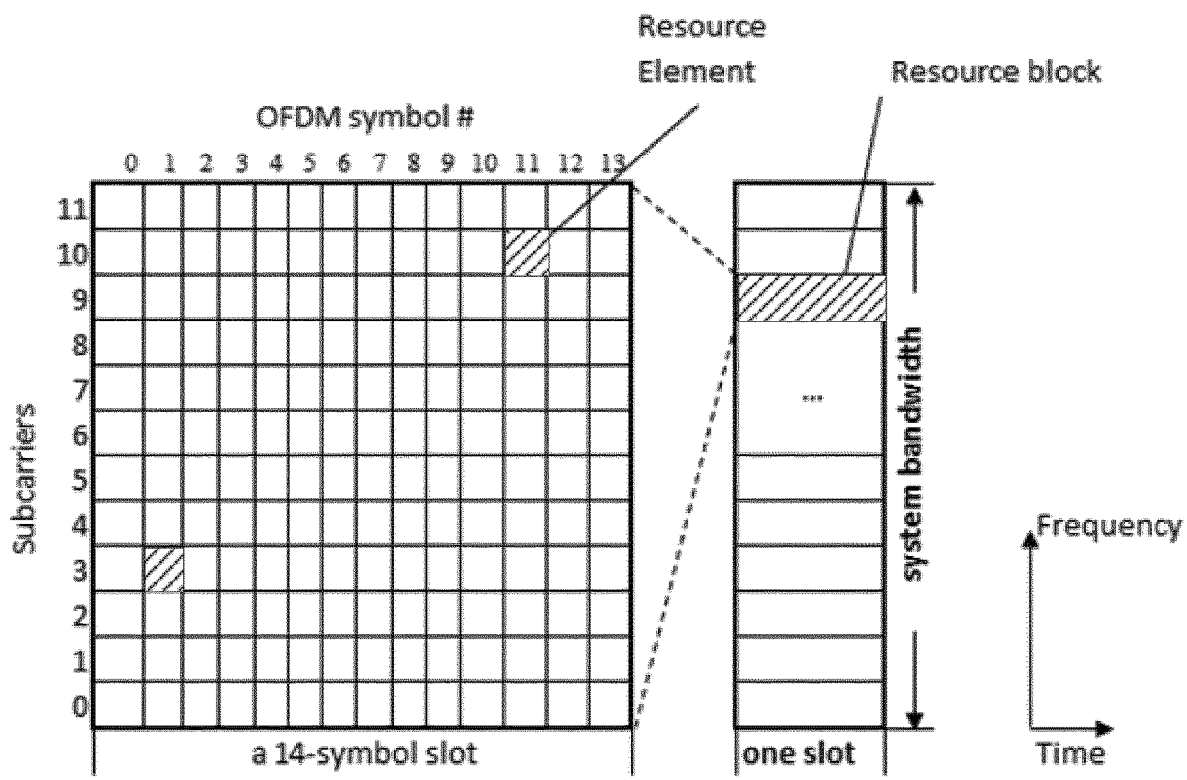
FIG. 5 shows an exemplary time-frequency resource grid for an NR slot.

FIG. 5 shows an exemplary time-frequency resource grid for an NR slot. As illustrated in FIG. 5, a resource block (RB) consists of a group of 12 contiguous OFDM subcarriers for a duration of a 14-symbol slot. Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWB}^{size}-1$, where i is the index of the particular BWP for the carrier. Similar to LTE, each NR resource element (RE) corresponds to one OFDM subcarrier during one OFDM symbol interval. NR supports various SCS values $\Delta f=(15\times 2^\mu)$ kHz, where $\mu\in(0,1,2,3,4)$ are referred to as "numerologies." Numerology $\mu=0$ (i.e., $\Delta f=15$ kHz) provides the basic (or reference) SCS that is also used in LTE. The slot length is inversely related to SCS or numerology according to $1/2^\mu$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^\mu*180$ kHz.

Table 1 below summarizes the supported NR numerologies and associated parameters. Different DL and UL numerologies can be configured by the network.

TABLE 1

| μ | $\Delta f = 2^\mu \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 μs | 1.44 |
| 4 | 240 | Normal | 62.5 μs | 2.88 |

Figure 6A:
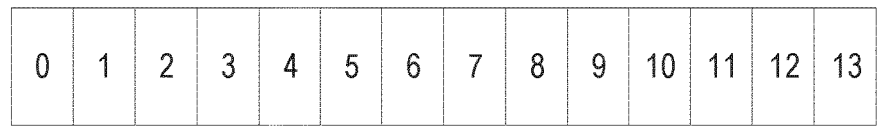
FIGS. 6A and 6B shows various exemplary NR slot configurations.

An NR slot can include 14 OFDM symbols for normal cyclic prefix and 12 symbols for extended cyclic prefix. FIG. 6A shows an exemplary NR slot configuration comprising 14 symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 13 or 11), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Figure 6B:
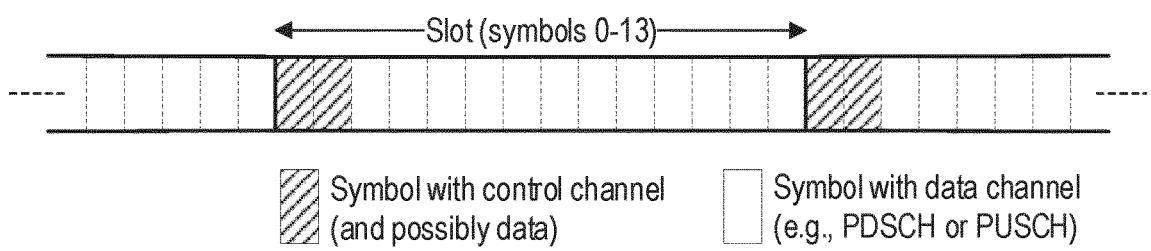

FIG. 6B shows another exemplary NR slot structure comprising 14 symbols. In this arrangement, PDCCH is confined to a region containing a particular number of symbols and a particular number of subcarriers, referred to as the control resource set (CORESET). In the exemplary structure shown in FIG. 6B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET includes multiple RBs (i.e., multiples of 12 REs) in the frequency domain and 1-3 OFDM symbols in the time domain, as further defined in 3GPP TS 38.211 § 7.3.2.2. A CORESET is functionally similar to the control region in an LTE subframe. In NR, however, each REG consists of all 12 REs of one OFDM symbol in a RB, whereas an LTE REG includes only four REs. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, if the precoder used at the transmitter for the REGs is not different. To assist the UE with channel estimation, the multiple REGs can be grouped together to form a REG bundle, and the REG bundle size for a CORESET (i.e., 2, 3, or 6 REGs) can be indicated to the UE. The UE can assume that any precoder used for the transmission of the PDCCH is the same for all the REGs in the REG bundle.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

Similar to LTE, NR data scheduling can be done dynamically on a per-slot basis. In each slot, the base station (e.g., gNB) transmits downlink control information (DCI) over PDCCH that indicates which UE is scheduled to receive data in that slot, as well as which RBs will carry that data. A UE first detects and decodes DCI and, if the DCI includes DL scheduling information for the UE, receives the corresponding PDSCH based on the DL scheduling information. DCI formats 1_0 and 1_1 are used to convey PDSCH scheduling.

To determine the modulation order, target code rate, and transport block size(s) for a scheduled PDSCH transmission, the UE first reads the 5-bit modulation and coding scheme field (IMcs) in the DCI (e.g., formats 1_0 or 1_1) to determine the modulation order ($Q_m$) and target code rate (R) based on the procedure defined in 3GPP TS 38.214 clause 5.1.3.1. Subsequently, the UE reads the redundancy version field (rv) in the DCI to determine the redundancy version. Based on this information together with the number of layers (u) and the total number of allocated PRBs before rate matching ($n_{PRB}$), the UE determines the TBS for the PDSCH according to the procedure defined in 3GPP TS 38.214 clause 5.1.3.2.

Likewise, DCI on PDCCH can include UL grants that indicate which UE is scheduled to transmit data on PUCCH in that slot, as well as which RBs will carry that data. A UE first detects and decodes DCI and, if the DCI includes an uplink grant for the UE, transmits the corresponding PUSCH on the resources indicated by the UL grant. DCI formats 0_0 and 0_1 are used to convey UL grants for PUSCH, while other DCI formats (2_0, 2_1, 2_2 and 2_3) are used for other purposes including transmission of slot format information, reserved resource, transmit power control information, etc.

A DCI includes a payload complemented with a Cyclic Redundancy Check (CRC) of the payload data. Since DCI is sent on PDCCH that is received by multiple UEs, an identifier of the targeted UE needs to be included. In NR, this is done by scrambling the CRC with a Radio Network Temporary Identifier (RNTI) assigned to the UE. Most commonly, the cell RNTI (C-RNTI) assigned to the targeted UE by the serving cell is used for this purpose.

DCI payload together with an identifier-scrambled CRC is encoded and transmitted on the PDCCH. Given previously configured search spaces, each UE tries to detect a PDCCH addressed to it according to multiple hypotheses (also referred to as "candidates") in a process known as "blind decoding." PDCCH candidates can span 1, 2, 4, 8, or 16 CCEs, with the number of CCEs referred to as the aggregation level (AL) of the PDCCH candidate. If more than one CCE is used, the information in the first CCE is repeated in the other CCEs. By varying AL, PDCCH can be made more or less robust for a certain payload size. In other words, PDCCH link adaptation can be performed by adjusting AL. Depending on AL, PDCCH candidates can be located at various time-frequency locations in the CORESET.

Once a UE decodes a DCI, it de-scrambles the CRC with RNTI(s) that is(are) assigned to it and/or associated with the particular PDCCH search space. In case of a match, the UE considers the detected DCI as being addressed to it, and follows the instructions (e.g., scheduling information) in the DCI.

A hashing function can be used to determine CCEs corresponding to PDCCH candidates that a UE must monitor within a search space set. The hashing is done differently for different UEs so that the CCEs used by the UEs are randomized, thereby reducing the probability of collisions between multiple UEs for which PDCCH messages are included in a CORESET. A monitoring periodicity is also configured for different PDCCH candidates. In any particular slot, the UE may be configured to monitor multiple PDCCH candidates in multiple search spaces which may be mapped to one or more CORESETs. PDCCH candidates may need to be monitored multiple times in a slot, once every slot or once in multiple of slots.

DCI can also include information about various timing offsets (e.g., in slots or subframes) between PDCCH and PDSCH, PUSCH, HARQ, and/or CSI-RS. For example, offset K0 represents the number of slots between the UE's PDCCH reception of a PDSCH scheduling DCI (e.g., formats 1_0 or 1_1) and the subsequent PDSCH transmission. Likewise, offset K1 represents the number of slots between this PDSCH transmission and the UE's responsive HARQ ACK/NACK transmission on the PUSCH. In addition, offset K3 represents the number of slots between this responsive ACK/NACK and the corresponding retransmission of data on PDSCH. In addition, offset K2 represents the number of slots between the UE's PDCCH reception of a PUSCH grant DCI (e.g., formats 0_0 or 0_1) and the subsequent PUSCH transmission. Each of these offsets can take on values of zero and positive integers.

In addition to dynamic scheduling on a per-slot basis, discussed above, NR also supports semi-persistent scheduling in the DL. In this approach, the network configures a periodicity of PDSCH transmission via RRC and then controls the start and stop of transmissions via DCI in PDCCH. One advantage of this technique is reduction of control signaling overhead on PDCCH. NR also supports a similar feature on the UL, referred to as configured grants (CG).

Multi-antenna technology can be used to improve various aspects of a communication system such as 4G/LTE or 5G/NR, including system capacity (e.g., more users per unit bandwidth per unit area), coverage (e.g., larger area for given bandwidth and number of users), and increased per-user data rate (e.g., in a given bandwidth and area). Multi-antenna technology can also ensure better wireless links as a mobile or fixed device experiences a time-varying channel.

In relatively poor channels (e.g., limited by interference and/or noise, such as in high user load or near cell edge), multiple antennas at both the transmitter and the receiver can improve signal-to-interference-plus-noise ratio (SINR) and/or achieve an additional diversity against fading. In relatively good channel conditions, however, the channel capacity becomes saturated such that further improving the SINR provides limited capacity increases. In such cases, using multiple antennas at both the transmitter and the receiver can be used to create multiple parallel communication "channels" over the radio interface. This can facilitate a highly efficient utilization of both the available transmit power and the available bandwidth resulting in, e.g., very high data rates within a limited bandwidth without a disproportionate degradation in coverage. For example, under certain conditions, the channel capacity can increase linearly with the number of antennas and avoid saturation in the data capacity and/or rates. These techniques are commonly referred to as "spatial multiplexing" or multiple-input, multiple-output (MIMO) antenna processing.

MIMO operation can be described mathematically as follows. A symbol vector s carrying r information symbols is multiplied by an $N_T \times r$ precoder matrix W, which serves to distribute the transmit energy in a subspace of the $N_T$-dimensional vector space, corresponding to $N_T$ antenna elements. Each of the r symbols in s corresponds to a "layer," and r is referred to as the transmission "rank." In this way, spatial multiplexing is achieved since multiple symbols can be transmitted simultaneously over the same time/frequency resource element (TFRE). The number of symbols r is typically adapted to suit the current channel properties.

In the transmitter, a transport block (TB) of user data undergoes channel coding at a code rate needed to protect against channel errors, resulting in one or more codewords. Subsequently, each codeword is mapped to one or more of the r layers for transmission. To correctly receive the r-layer ("full rank") signal, a receiver must use at least r independent antenna elements.

The UE receives and decodes such transmissions, which can include one or more TBs depending on the number of layers used for DL transmission by the network. In some scenarios, there is a risk that a UE's peak decoder throughput can be exceeded for a given NR DL configuration. Such peak throughput can be related to available UE resources. For example, limited-buffer rate matching (LBRM, also referred to as "first stage rate matching") techniques are needed when the receiver (e.g., UE) has a limited amount of soft buffer size available for each hybrid ARQ (HARQ) process.

In LBRM, the transmitter (e.g., network) may have knowledge of the receiver's soft buffer. Based on this knowledge, the network may limit the transmitted code bits to an amount that can be stored in receiver's soft buffer for all (re)transmissions of a given transport block (TB). The existing LBRM mechanism for NR is specified in 3GPP TS 38.214 clause 5.1.3, of which the most relevant part is repeated below:

——— Begin Excerpt from 3GPP TS 38.214 ———
The UE is not expected to handle any transport blocks (TBs) in a 14 consecutive-symbol duration for normal CP (or 12 for extended CP) ending at the last symbol of the latest PDSCH transmission within an active BWP on a serving cell whenever $$2^{max(0,\mu-\mu')} \cdot \sum_{i \in S} \left\lfloor \frac{C'_i}{L_i} \right\rfloor x_i \cdot F_i > \frac{1}{R_{LBRM}} \cdot TBS_{LBRM}$$

where, for the serving cell,
S is the set of TBs belonging to PDSCH(s) that are partially or fully contained in the consecutive-symbol duration
for the ith TB
  $C'_i$ is the number of scheduled code blocks for as defined in [5, 38.212].
  $L_i$ is the number of OFDM symbols assigned to the PDSCH
  $x_i$ is the number of OFDM symbols of the PDSCH contained in the consecutive-symbol duration $$F_i = \max_{j=0,\ldots,J-1} \left( \min(k_{0,i}^j + E_i^j, N_{cb,i}) \right)$$

based on values defined in 3GPP TS 38.212 subclause 5.4.2.1
  $k_{0,i}^j$ is the starting location of RV for the jth transmission
  $E_i^j = \min(E_r)$ of the scheduled code blocks for the jth transmission
  $N_{cb,i}$ is the circular buffer length
  J−1 is the current (re)transmission for the ith TB
  $\mu'$ corresponds to the subcarrier spacing of the BWP (across all configured BWPs of a carrier) that has the largest configured number of PRBs
  in case there is more than one BWP corresponding to the largest configured number of PRBs, $\mu'$ follows the BWP with the largest subcarrier spacing.
  $\mu'$ corresponds to the subcarrier spacing of the active BWP
  $R_{LBRM}$=2/3 as defined in 3GPP TS 38.212 subclause 5.4.2.1.
  $TBS_{LBRM}$ as defined in 3GPP TS 38.212 subclause 5.4.2.1.
If the UE skips decoding, the physical layer indicates to higher layer that the transport block is not successfully decoded.
——— End Excerpt from 3GPP TS 38.214 ———

The most relevant parts of 3GPP TS 38.212 subclause 5.4.2.1, referenced in the above text, is repeated below. References to other subclauses are within the same document unless specifically noted otherwise.
——— Begin Excerpt from 3GPP TS 38.212 ———
The bit sequence after encoding $d_0, d_1, d_2, \ldots, d_{N-1}$ from Subclause 5.3.2 is written into a circular buffer of length $N_{cb}$ for the r-th coded block, where N is defined in Subclause 5.3.2. For the r-th code block, let $N_{cb}=N$ if $I_{LBRM}=0$ and $N_{cb}=\min(N,N_{ref})$ otherwise, where $$N_{ref} = \left\lfloor \frac{TBS_{LBRM}}{C \cdot R_{LBRM}} \right\rfloor,$$

$R_{LBRB}$, $TBS_{LBRM}$ is determined according to 3GPP TS 38.214 subclause 6.1.4.2 for UL-SCH and 3GPP TS 38.214 Subclause 5.1.3.2 for DL-SCH/PCH, assuming the following:
  maximum number of layers for one TB for UL-SCH is given by X, where
    if the higher layer parameter maxMIMO-Layers of PUSCH-ServingCellConfig of the serving cell is configured, X is given by that parameter
    else if the higher layer parameter maxRank of puschConfig of the serving cell is configured, X is given by the maximum value of maxRank across all BWPs of the serving cell
    otherwise, X is given by the maximum number of layers for PUSCH supported by the UE for the serving cell
  maximum number of layers for one TB for DL-SCH/PCH is given by the minimum of X and 4, where
    if the higher layer parameter maxMIMO-Layers of PDSCH-ServingCellConfig of the serving cell is configured, X is given by that parameter
    otherwise, X is given by the maximum number of layers for PDSCH supported by the UE for the serving cell
  maximum modulation order configured for the serving cell, if configured by higher layers; otherwise a maximum modulation order $Q_m$=6 is assumed for DL-SCH;
  maximum coding rate of 948/1024;
  $n_{PRB}=n_{PRB,LBRM}$ is given by Table 5.4.2.1-1, where the value of $n_{PRB,LBRM}$ for DL-SCH is determined according to the initial bandwidth part if there is no other bandwidth part configured to the UE;
  $N_{RE}=156 \cdot n_{PRB}$;
  c is the number of code blocks of the transport block determined according to Subclause 5.2.2.

TABLE 5

Value of $n_{PRB, LBRM}$

| Maximum number of PRBs across all configured BWPs of a carrier | $n_{PRB, LBRM}$ |
|---|---|
| Less than 33 | 32 |
| 33 to 66 | 66 |
| 67 to 107 | 107 |

TABLE 5-continued

Value of $n_{PRB,LBRM}$

| Maximum number of PRBs across all configured BWPs of a carrier | $n_{PRB, LBRM}$ |
|---|---|
| 108 to 135 | 135 |
| 136 to 162 | 162 |
| 163 to 217 | 217 |
| Larger than 217 | 273 |

———End Excerpt from 3GPP TS 38.212———

As specified above, the existing NR LBRM solution allows limiting the coded bit buffer for a reference transport block size (TBS) at a code rate no lower than 2/3. A transport block of this reference TBS that is transmitted over a certain duration (e.g., one slot) yields a peak rate supported at a mother code rate of 2/3. Even so, there can be smaller TBS(s) transmitted over shorter durations that can also yield peak rate, but the existing solution does not necessarily limit the coded bit buffer for such cases. As such, if these smaller TBS(s) are retransmitted, the peak rate may have to be supported at a mother code rate lower than 2/3 to accommodate the limited buffer size. For example, this can happen for back-to-back scheduling, as well as for numerology switching scenarios (e.g., two BWPs configured with 15 kHz and 30 kHz, respectively).

The threshold and/or condition for applying LBRM restriction as currently specified:

$$2^{max(0,\mu-\mu')} \cdot \sum_{i \in S} \left\lfloor \frac{C'_i}{L_i} \right\rfloor x_i \cdot F_i > \frac{1}{R_{LBRM}} \cdot TBS_{LBRM}, \quad (1)$$

is inefficient and can lead to performance degradation. As specified in 3GPP TS 38.212, the LBRM functionality, including TBS limitation $TBS_{LBRM}$, is defined on a per-TB basis. Furthermore, $TBS_{LBRM}$ is determined "assuming that [the] maximum number of layers for one TB for DL-SCH/PCH is given by the minimum of X and 4," meaning that $TBS_{LBRM}$ is based on a maximum of four (4) transmission layers. Thus, when the network configures the UE with more than four layers on a serving cell, the LBRM restriction becomes much more limiting, reducing the opportunities for transmitting RVs other than 0 for large TBS. Without multiple RVs, the UE will have to decode the transport block using Chase combining rather than incremental redundancy, which degrates UE DL data reception performance.

Exemplary embodiments of the present disclosure can address these and other issues, problems, and/or difficulties by providing novel techniques for scaling and/or adjusting the LBRM threshold based on a function of the maximum number of DL transmission layers. Such embodiments accommodate UE complexity and decoding constraints while minimizing and/or reducing network scheduler restrictions, especially when UE supports and is configured more than four DL transmission layers in a serving cell.

In various embodiments, the scaling and/or adjusting of the LBRM threshold can be performed by introducing a new factor, Q, to the threshold equation given above. In such embodiments, the LBRM threshold equation can be expressed as:

$$2^{max(0,\mu-\mu')} \cdot \sum_{i \in S} \left\lfloor \frac{C'_i}{L_i} \right\rfloor x_i \cdot F_i > Q \cdot \frac{1}{R_{LBRM}} \cdot TBS_{LBRM}, \quad (2)$$

where Q=f(X), and X is defined for PDSCH as in 3GPP TS 38.212 subclause 5.4.2.1 as:
  if the higher layer parameter maxMIMO-Layers of PDSCH-ServingCellConfig of the serving cell is configured, X is given by that parameter;
  otherwise, X is given by the maximum number of layers for PDSCH supported by the UE for the serving cell.

In some embodiments, Q can be determined by max (1,X/4). In other words, f(X)=max (1,X/4). FIG. 7 shows a graph of this exemplary function relating X and Q according to these embodiments, which can facilitate linear scaling of the right-handside of the LBRM restriction according to number of layers if the number of supported layers is greater than 4.

In other embodiments, Q can be determined by ceil(X/4), where "ceil" denotes rounding the operand to the next highest integer. In other words, f(X)=ceil(X/4). FIG. 8 shows a graph of this exemplary function relating X and Q according to these embodiments, which can facilitate scaling of the right-hand side of the LBRM restriction according to number of transport blocks (TBs) if the number of supported layers is greater than 4.

In some embodiments, Q can be determined by a lookup table with mapping between X and Q. FIG. 9 shows an exemplary lookup table and/or function relating Q and X, according to various exemplary embodiments of the present disclosure. Since various values of Q corresponding to each value of X can be used, the lookup table arrangement can provide significant flexibility for adapting the LBRM restriction, particularly if the number of supported layers is greater than 4.

The following example illustrates various embodiments of the present disclosure. However, this example is not intended to be limiting in any way, but rather is used to clarify understanding of the disclosed techniques in general, including various exemplary benefits and/or advantages. In the following example, the UE supports up to eight transmission layers on the serving cell and 256-QAM modulation (Qm=8). However, the number of layers that can be used for one TB is four, meaning that two TBs can be mapped to the supported eight layers. The LBRM parameters $n_{PRB,LBRM}$ and $TBS_{LBRM}$ are determined as 273 PRBs and 1277992 bits, respectively, according to 3GPP TS 38.212 subclause 5.4.2.1.

Based on these parameters, the network determines that it can transmit two codewords (CWs), each with a max TBS of 1277992 bits, and with each coded at rate-2/3. In other words, the network determines that it can transmit up to 2*1277992/(2/3)=3833976 coded bits to this particular UE. However, according to the LBRM triggering condition is currently specified in 3GPP TS 38.214 subclause 5.1.3, the UE is not expecting to receive more than $TBS_{LBRM}/R_{LBRM}$=1277992/(2/3)=1916988 coded bits. Thus, when the network configures UE with eight-layer transmission, the effective coding rate would be 2*1277992/1916988=1.33, which is much higher than the $R_{LBRM}$=2/3 specified in the standard. As such, the network will not be able schedule peak rate for that UE and the UE could skip decoding, resulting in performance loss.

FIG. 10 illustrates this transmitter-receiver mismatch for the example configuration discussed above. If the UE splits the expected received coded bits (e.g., the maximum 1916988 coded bits that the UE is expecting) equally between the two TBs, it will only receive half of the coded bits for each TB, which may cause the UE to incorrectly decode the incompletely received TB, or to skip decoding the incomplete TB altogether.

According to various embodiments, the LBRM restriction threshold specified in 3GPP TS 38.214 subclause 5.1.3 can be updated to incorporate the additional factor Q=f(X), where X=8 is the number of layers in this example. If Q=2 is determined according to any of the various embodiments described above, then the effective coding rate of the eight-layer, two-TB transmission would be (2*1277992)/(2*1916988)=2/3, which is same as $R_{LBRM}$=2/3. In this manner, the network is able to schedule peak rate to the UE over the eight-layer transmission and take advantage of LBRM down to rate-2/3. Similar improvements can be made in relation to transmissions using other numbers of layers, such as X=5, 6, or 7.

The embodiments described above can be further illustrated with reference to FIGS. 11-12, which depict exemplary methods (e.g., procedures) performed by UEs and network nodes, respectively. Put differently, various features of the operations described below correspond to various embodiments described above.

Figure 11:
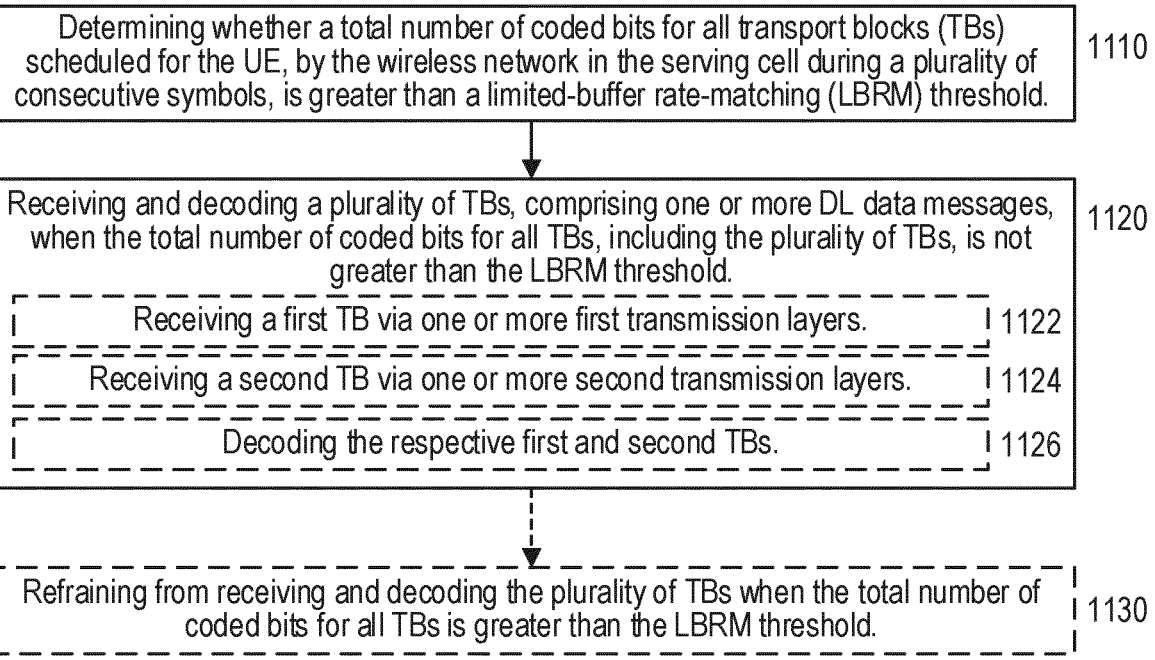
FIG. 11 shows a flow diagram of an exemplary method (e.g., procedure) for a user equipment (UE, e.g., wireless device, IoT device, modem, etc., or component thereof), according to various exemplary embodiments of the present disclosure.

In particular, FIG. 11 shows a flow diagram of an exemplary method (e.g., procedure) for receiving downlink (DL) data from a serving cell in a wireless network, according to various exemplary embodiments of the present disclosure. The exemplary method can be performed by a user equipment (UE, e.g., wireless device, IoT device, modem, etc. or component thereof) operating in a cell of a wireless network (e.g., E-UTRAN, NG-RAN). For example, the exemplary method shown in FIG. 11 can be implemented in a UE configured as described herein with reference to other figures. Furthermore, the exemplary method shown in FIG. 11 can be used cooperatively with other exemplary methods described herein (e.g., FIG. 12) to provide various exemplary benefits described herein. Although FIG. 11 shows blocks in a particular order, the operations of the exemplary method can be performed in a different order than shown and can be combined and/or divided into blocks having different functionality than shown. Optional blocks or operations are indicated by dashed lines.

The exemplary method can also include the operations of block 1110, where the UE can determine whether a total number of coded bits for all transport blocks (TBs) scheduled for the UE, by the wireless network in the serving cell during a plurality of consecutive symbols, is greater than a limited-buffer rate-matching (LBRM) threshold. The LBRM threshold can be based on a maximum number of transmission layers (X) associated with the UE for the serving cell.

In some embodiments, X is greater than four (4). In some embodiments, X can be given and/or determined by the following parameters:
- a higher-layer parameter maxMIMO-Layers of the serving cell, when the higher-layer parameter has been configured for the UE by the wireless network; and
- the maximum number of layers for physical downlink shared channel (PDSCH) supported by the UE for the serving cell, when the higher-layer parameter has not been configured for the UE by the wireless network.

The exemplary method can also include the operations of block 1120, where the UE can receive and decode a plurality of TBs, comprising one or more DL data messages, when to the total number of coded bits for all TBs scheduled for the UE (i.e., during the consecutive symbols, including the plurality of TBs) is not greater than the LBRM threshold. In some embodiments, the plurality of TBs, comprising the one or more DL data messages, constitute all TBs scheduled for the UE by the wireless network in the serving cell during the plurality of consecutive symbols.

In some embodiments, the operations of block 1120 can include the operations of sub-blocks 1122-1126. In sub-block 1122, the UE can receive a first TB via one or more first transmission layers. In sub-block 1124, the UE can receive a second TB via one or more second transmission layers. In sub-block 1126, the UE can decode the respective first and second TBs.

In some embodiments, the exemplary method can also include the operations of block 1130, where the UE can refrain from receiving and decoding the plurality of TBs when the total number of coded bits for all TBs is greater than the LBRM threshold. For example, the UE can ignore the plurality of TBs when they cumulatively (i.e., together with any other TBs scheduled during the consecutive symbols) exceed the LBRM threshold. Put another way, the UE, in some examples, does not decode the plurality of TBs when the coded bits for the TBs exceeds the LBRM threshold.

In some embodiments, the LBRM threshold is determined according to the relation $$Q \cdot \frac{1}{R_{LMRM}} \cdot TBS_{LBRM},$$

where Q is determined based on ceil(X/4), $R_{LBRM}$ is an LBRM code rate, and $TBS_{LBRM}$ is an LBRM transport block size. In some embodiments, Q=ceil(X/4). It should be noted that "ceil(X/4)" is another representation of the function "$\lceil X/4 \rceil$", as used herein and as understood by a skilled person. In some embodiments, Q can be determined based on a lookup table relating a plurality of values of X to respective values of Q. Such a lookup table can represent various functions, including but not limited to ceil(X/4).

In some embodiments, the plurality of TBs can be received and decoded (e.g., in block 1120) based on $R_{LBRM}$ and $TBS_{LBRM}$. In some embodiments, $R_{LBRM}$ can be 2/3.

In some embodiments, the total number of coded bits for all TBs scheduled for the UE, by the wireless network in the serving cell during the plurality of consecutive symbols, can be determined according to the left-hand side of either equation (1) or equation (2) above, $$2^{max(0,\mu-\mu')} \cdot \sum_{i \in S} \left\lceil \frac{C'_i}{L_i} \right\rceil x_i \cdot F_i$$

wherein:
S is a set of all TBs scheduled for the UE on physical data channels that are at least partially included in the plurality of consecutive symbols, and i is an index to an i-th TB within S;
$C'_i$ is a number of scheduled code blocks for the i-th TB;
$L_i$ is a number of orthogonal frequency-division multiplexing (OFDM) symbols assigned to physical data channel for the i-th TB;
$x_i$ is a number of OFDM symbols of a physical data channel that are included in the plurality of consecutive symbols;
$F_i$ is a factor related to a position of the i-th TB in a circular buffer of the UE; and
μ–μ' is a difference between numerologies of the UE's active bandwidth part (BWP) and the UE's configured BWP having the largest number of configured physical resource blocks (PRBs) or the largest subcarrier spacing.

Figure 12:
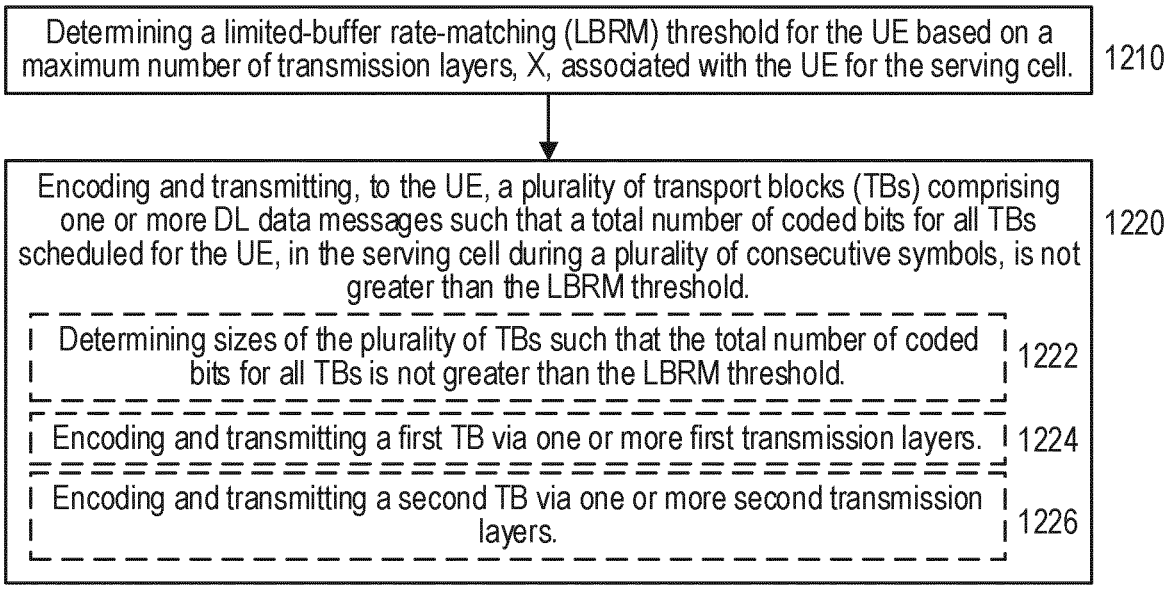
FIG. 12 shows a flow diagram of and exemplary method (e.g., procedure) for a network node (e.g., base station, gNB, eNB, en-gNB, ng-eNB, etc., or component thereof), according to various exemplary embodiments of the present disclosure.

In addition, FIG. 12 shows a flow diagram of an exemplary method (e.g., procedure) for downlink (DL) data transmission to a user equipment (UE) in a cell of a wireless network, according to various exemplary embodiments of the present disclosure. The exemplary method can be performed by a network node (e.g., base station, eNB, gNB, en-gNB, ng-eNB, etc., or component thereof) serving the cell in the wireless network (e.g., E-UTRAN, NG-RAN). For example, the exemplary method shown in FIG. 12 can be implemented in a network node configured as described herein with reference to other figures. Furthermore, the exemplary method shown in FIG. 12 can be used cooperatively with other exemplary methods described herein (e.g., FIG. 11) to provide various exemplary benefits described herein. Although FIG. 12 shows specific blocks in a particular order, the operations of the exemplary method can be performed in a different order than shown and can be combined and/or divided into blocks having different functionality than shown. Optional blocks or operations are indicated by dashed lines.

The exemplary method illustrated in FIG. 12 can include the operations of block 1210, where the network node can determine a limited-buffer rate-matching (LBRM) threshold for the UE based on a maximum number of transmission layers, X, associated with the UE for the serving cell. For example, the network node can determine the LBRM threshold for the UE in relation to receiving DL data (e.g., from a core network) for transmission to the UE in one or more data messages.

In some embodiments, X is greater than four (4). In some embodiments, X can be given and/or determined by the following parameters:

a higher-layer parameter maxMIMO-Layers of the serving cell, when the higher-layer parameter has been configured for the UE by the wireless network; and the maximum number of layers for physical downlink shared channel (PDSCH) supported by the UE for the serving cell, when the higher-layer parameter has not been configured for the UE by the wireless network.

The exemplary method can also include the operations of block 1220, where the network node can encode and transmit, to the UE, a plurality of transport blocks (TBs) comprising one or more DL data messages such that a total number of coded bits for all TBs scheduled for the UE, in the serving cell during a plurality of consecutive symbols, is not greater than the LBRM threshold (i.e., is less than or equal to the LBRM threshold). The total number of coded bits includes coded bits for the plurality of TBs. In some embodiments, the plurality of TBs, comprising the one or more DL data messages, constitute all TBs scheduled for the UE in the serving cell during the plurality of consecutive symbols.

In some embodiments, the operations of block 1220 can include the operations of sub-block 1222, where the network node can determine sizes of the plurality of TBs such that the total number of coded bits for all TBs (i.e., scheduled for the UE during the consecutive symbols) is not greater than the LBRM threshold. In some embodiments, the operations of block 1220 can include the operations of sub-blocks 1224-1226. In sub-block 1224, the network node can encode and transmit a first TB via one or more first transmission layers. In sub-block 1226, the UE can encode and transmit a second TB via one or more second transmission layers.

In some embodiments, the LBRM threshold is determined according to the relation $$Q \cdot \frac{1}{R_{LBRM}} \cdot TBS_{LBRM},$$

where Q is determined based on ceil(X/4), $R_{LBRM}$ is an LBRM code rate, and $TBS_{LBRM}$ is an LBRM transport block size. In some embodiments, Q=ceil(X/4). In some embodiments, Q can be determined based on a lookup table relating a plurality of values of X to respective values of Q. Such a lookup table can represent various functions, including but not limited to ceil(X/4).

In some embodiments, the plurality of TBs can be encoded and transmitted (e.g., in block 1220) based on $R_{LBRM}$ and $TBS_{LBRM}$. In some embodiments, $R_{LBRM}$ can be 2/3.

In some embodiments, the total number of coded bits for all TBs scheduled for the UE, by the wireless network in the serving cell during the plurality of consecutive symbols, can be determined according to the left-hand side of either equation (1) or equation (2) above, $$2^{max(0,\mu-\mu')} \sum_{i \in S} \left\lceil \frac{C_i'}{L_i} \right\rceil x_i \cdot F_i$$

wherein:
S is a set of all TBs scheduled for the UE on physical data channels that are at least partially included in the plurality of consecutive symbols, and i is an index to an i-th TB within S;
$C_i'$ is a number of scheduled code blocks for the i-th TB;
$L_i$ is a number of orthogonal frequency-division multiplexing (OFDM) symbols assigned to physical data channel for the i-th TB;
$x_i$ is a number of OFDM symbols of a physical data channel that are included in the plurality of consecutive symbols;
$F_i$ is a factor related to a position of the i-th TB in a circular buffer of the UE; and
μ-μ' is a difference between numerologies of the UE's active bandwidth part (BWP) and the UE's configured BWP having the largest number of configured physical resource blocks (PRBs) or the largest subcarrier spacing.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 13:
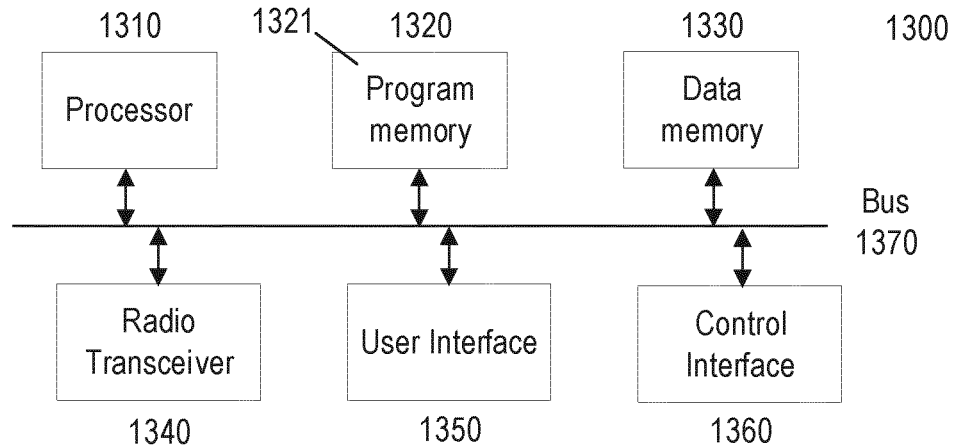
FIG. 13 is a block diagram of an exemplary wireless device or UE according to various exemplary embodiments of the present disclosure.

FIG. 13 shows a block diagram of an exemplary wireless device or user equipment (UE) 1300 (hereinafter referred to as "UE 1300") according to various embodiments of the present disclosure, including those described above with reference to other figures. For example, UE 1300 can be configured by execution of instructions, stored on a computer-readable medium, to perform operations corresponding to one or more of the exemplary methods and/or procedures described above.

UE 1300 can include a processor 1310 (also referred to as "processing circuitry") that can be operably connected to a program memory 1320 and/or a data memory 1330 via a bus 1370 that can comprise parallel address and data buses, serial ports, or other methods and/or structures known to those of ordinary skill in the art. Program memory 1320 can store software code, programs, and/or instructions (collectively shown as computer program product 1361 in FIG. 13) that, when executed by processor 1310, can configure and/or facilitate UE 1300 to perform various operations, including operations corresponding to various exemplary methods described herein. As part of or in addition to such operations, execution of such instructions can configure and/or facilitate UE 1300 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1×RTT, CDMA2000, 802.11 WiFi, HDMI, USB, Firewire, etc., or any other current or future protocols that can be utilized in conjunction with radio transceiver 1340, user interface 1350, and/or control interface 1360.

As another example, processor 1310 can execute program code stored in program memory 1320 that corresponds to MAC, RLC, PDCP, and RRC layer protocols standardized by 3GPP (e.g., for NR and/or LTE). As a further example, processor 1310 can execute program code stored in program memory 1320 that, together with radio transceiver 1340, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA). As another example, processor 1310 can execute program code stored in program memory 1320 that, together with radio transceiver 1340, implements device-to-device (D2D) communications with other compatible devices and/or UEs.

Program memory 1320 can also include software code executed by processor 1310 to control the functions of UE 1300, including configuring and controlling various components such as radio transceiver 1340, user interface 1350, and/or host interface 1360. Program memory 1320 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1320 can comprise an external storage arrangement (not shown) remote from UE 1300, from which the instructions can be downloaded into program memory 1320 located within or removably coupled to UE 1300, so as to enable execution of such instructions.

Data memory 1330 can include memory area for processor 1310 to store variables used in protocols, configuration, control, and other functions of UE 1300, including operations corresponding to, or comprising, any of the exemplary methods and/or procedures described herein. Moreover, program memory 1320 and/or data memory 1330 can include non-volatile memory (e.g., flash memory), volatile memory (e.g., static or dynamic RAM), to or a combination thereof. Furthermore, data memory 1330 can comprise a memory slot by which removable memory cards in one or more formats (e.g., SD Card, Memory Stick, Compact Flash, etc.) can be inserted and removed.

Persons of ordinary skill will recognize that processor 1310 can include multiple individual processors (including, e.g., multi-core processors), each of which implements a portion of the functionality described above. In such cases, multiple individual processors can be commonly connected to program memory 1320 and data memory 1330 or individually connected to multiple individual program memories and or data memories. More generally, persons of ordinary skill in the art will recognize that various protocols and other functions of UE 1300 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

Radio transceiver 1340 can include radio-frequency transmitter and/or receiver functionality that facilitates the UE 1300 to communicate with other equipment supporting like wireless communication standards and/or protocols. In some exemplary embodiments, the radio transceiver 1340 includes one or more transmitters and one or more receivers that enable UE 1300 to communicate according to various protocols and/or methods proposed for standardization by 3GPP and/or other standards bodies. For example, such functionality can operate cooperatively with processor 1310 to implement a PHY layer based on OFDM, OFDMA, and/or SC-FDMA technologies, such as described herein with respect to other figures.

In some embodiments, radio transceiver 1340 includes one or more transmitters and one or more receivers that can facilitate the UE 1300 to communicate with various LTE, LTE-Advanced (LTE-A), and/or NR networks according to standards promulgated by 3GPP. In some exemplary embodiments of the present disclosure, the radio transceiver 1340 includes circuitry, firmware, etc. necessary for the UE 1300 to communicate with various NR, NR-U, LTE, LTE-A, LTE-LAA, UMTS, and/or GSM/EDGE networks, also according to 3GPP standards. In some embodiments, radio transceiver 1340 can include circuitry supporting D2D communications between UE 1300 and other compatible UEs.

In some embodiments, radio transceiver 1340 includes circuitry, firmware, etc. necessary for the UE 1300 to communicate with various CDMA2000 networks, according to 3GPP2 standards. In some embodiments, the radio transceiver 1340 can be capable of communicating using radio technologies that operate in unlicensed frequency bands, such as IEEE 802.11 WiFi that operates using frequencies in the regions of 2.4, 5.6, and/or 60 GHz. In some embodiments, radio transceiver 1340 can include a transceiver that is capable of wired communication, such as by using IEEE 802.3 Ethernet technology. The functionality particular to each of these embodiments can be coupled with and/or controlled by other circuitry in the UE 1300, such as the processor 1310 executing program code stored in program memory 1320 in conjunction with, and/or supported by, data memory 1330.

User interface 1350 can take various forms depending on the particular embodiment of UE 1300, or can be absent from UE 1300 entirely. In some embodiments, user interface 1350 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 1300 can comprise a tablet computing device including a larger touchscreen display. In such embodiments, one or more of the mechanical features of the user interface 1350 can be replaced by comparable or functionally equivalent virtual user interface features (e.g., virtual keypad, virtual buttons, etc.) implemented using the touchscreen display, as familiar to persons of ordinary skill in the art. In other embodiments, the UE 1300 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the UE 1300 having a touch screen display are capable of receiving user inputs, such as inputs related to exemplary methods and/or procedures described herein or otherwise known to persons of ordinary skill in the art.

In some embodiments, UE 1300 can include an orientation sensor, which can be used in various ways by features and functions of UE 1300. For example, the UE 1300 can use outputs of the orientation sensor to determine when a user has changed the physical orientation of the UE 1300's touch screen display. An indication signal from the orientation sensor can be available to any application program executing on the UE 1300, such that an application program can change the orientation of a screen display (e.g., from portrait to landscape) automatically when the indication signal indicates an approximate 90-degree change in physical orientation of the device. In this exemplary manner, the application program can maintain the screen display in a manner that is readable by the user, regardless to of the physical orientation of the device. In addition, the output of the orientation sensor can be used in conjunction with various exemplary embodiments of the present disclosure.

A control interface 1360 of the UE 1300 can take various forms depending on the particular exemplary embodiment of UE 1300 and of the particular interface requirements of other devices that the UE 1300 is intended to communicate with and/or control. For example, the control interface 1360 can comprise an RS-232 interface, an RS-4135 interface, a USB interface, an HDMI interface, a Bluetooth interface, an IEEE ("Firewire") interface, an I²C interface, a PCMCIA interface, or the like. In some exemplary embodiments of the present disclosure, control interface 1360 can comprise an IEEE 802.3 Ethernet interface such as described above. In some exemplary embodiments of the present disclosure, the control interface 1360 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 1300 can comprise more functionality than is shown in FIG. 13 including, for example, a video and/or still-image camera, microphone, media player and/or recorder, etc. Moreover, radio transceiver 1340 can include circuitry necessary to communicate using additional radio-frequency communication standards including Bluetooth, GPS, and/or others. Moreover, the processor 1310 can execute software code stored in the program memory 1320 to control such additional functionality. For example, directional velocity and/or position estimates output from a GPS receiver can be available to any application program executing on the UE 1300, including various exemplary methods and/or computer-readable media according to various exemplary embodiments of the present disclosure.

Figure 14:
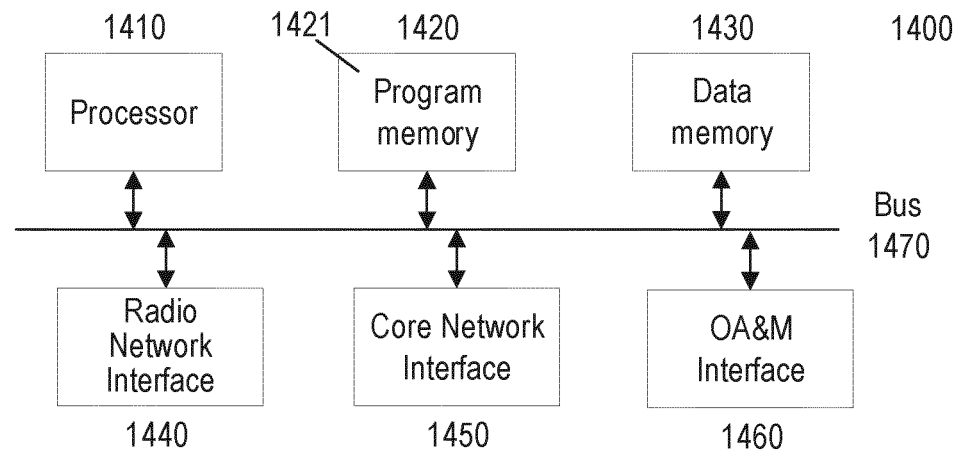
FIG. 14 is a block diagram of an exemplary network node according to various exemplary embodiments of the present disclosure.

FIG. 14 shows a block diagram of an exemplary network node 1400 according to various embodiments of the present disclosure, including those described above with reference to other figures. For example, exemplary network node 1400 can be configured by execution of instructions, stored on a computer-readable medium, to perform operations corresponding to one or more of the exemplary methods and/or procedures described above. In some exemplary embodiments, network node 1400 can comprise a base station, eNB, gNB, or one or more components thereof. For example, network node 1400 can be configured as a central unit (CU) and one or more distributed units (DUs) according to NR gNB architectures specified by 3GPP. More generally, the functionally of network node 1400 can to be distributed across various physical devices and/or functional units, modules, etc.

Network node 1400 can include processor 1410 (also referred to as "processing circuitry") that is operably connected to program memory 1420 and data memory 1430 via bus 1470, which can include parallel address and data buses, serial ports, or other methods and/or structures known to those of ordinary skill in the art.

Program memory 1420 can store software code, programs, and/or instructions (collectively shown as computer program product 1421 in FIG. 14) that, when executed by processor 1410, can configure and/or facilitate network node 1400 to perform various operations, including operations corresponding to various exemplary methods described herein. As part of and/or in addition to such operations, program memory 1420 can also include software code executed by processor 1410 that can configure and/or facilitate network node 1400 to communicate with one or more other UEs or network nodes using other protocols or protocol layers, such as one or more of the PHY, MAC, RLC, PDCP, and RRC layer protocols standardized by 3GPP for LTE, LTE-A, and/or NR, or any other higher-layer (e.g., NAS) protocols utilized in conjunction with radio network interface 1440 and/or core network interface 1450. By way of example, core network interface 1450 can comprise the S1 or NG interface and radio network interface 1440 can comprise the Uu interface, as standardized by 3GPP. Program memory 1420 can also comprise software code executed by processor 1410 to control the functions of network node 1400, including configuring and controlling various components such as radio network interface 1440 and core network interface 1450.

Data memory 1430 can comprise memory area for processor 1410 to store variables used in protocols, configuration, control, and other functions of network node 1400. As such, program memory 1420 and data memory 1430 can comprise non-volatile memory (e.g., flash memory, hard disk, etc.), volatile memory (e.g., static or dynamic RAM), network-based (e.g., "cloud") storage, or a combination thereof. Persons of ordinary skill in the art will recognize that processor 1410 can include multiple individual processors (not shown), each of which can implement a portion of the functionality described above. In such case, multiple individual processors may be commonly connected to program memory 1420 and data memory 1430 or individually connected to multiple individual program memories and/or data memories. More generally, persons of ordinary skill will recognize that various protocols and other functions of network node 1400 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1440 can comprise transmitters, receivers, signal processors, ASICs, antennas, beamforming units, and other circuitry that enables network node 1400 to communicate with other equipment such as, in some embodiments, a plurality of compatible user equipment (UE). In some embodiments, interface 1440 can also enable network node 1400 to communicate with compatible satellites of a satellite communication network. In some exemplary embodiments, radio network interface 1440 can comprise various protocols or protocol layers, such as the PHY, MAC, RLC, PDCP, and/or RRC layer protocols standardized by 3GPP for LTE, LTE-A, LTE-LAA, NR, NR-U, etc.; improvements thereto such as described herein above; or any other higher-layer protocols utilized in conjunction with radio network interface 1440. According to further exemplary embodiments of the present disclosure, the radio network interface 1440 can comprise a PHY layer based on OFDM, OFDMA, and/or SC-FDMA technologies. In some embodiments, the functionality of such a PHY layer can be provided cooperatively by radio network interface 1440 and processor 1410 (including program code in memory 1420).

Core network interface 1450 can comprise transmitters, receivers, and other circuitry that enables network node 1400 to communicate with other equipment in a core network such as, in some embodiments, circuit-switched (CS) and/or packet-switched Core (PS) networks. In some embodiments, core network interface 1450 can comprise the S1 interface standardized by 3GPP. In some embodiments, core network interface 1450 can comprise the NG interface standardized by 3GPP. In some exemplary embodiments, core network interface 1450 can comprise one or more interfaces to one or more AMFs, SMFs, SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1450 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

In some embodiments, network node 1400 can include hardware and/or software that configures and/or facilitates network node 1400 to communicate with other network nodes in a RAN, such as with other eNBs, gNBs, ng-eNBs, en-gNBs, IAB nodes, etc. Such hardware and/or software can be part of radio network interface 1440 and/or core network interface 1450, or can be a separate functional unit (not shown). For example, such hardware and/or software can configure and/or facilitate network node 1400 to communicate with other RAN nodes via the X2 or Xn interfaces, as standardized by 3GPP.

OA&M interface 1460 can comprise transmitters, receivers, and other circuitry that enables network node 1400 to communicate with external networks, computers, databases, and the like for purposes of operations, administration, and maintenance of network node 1400 or other network equipment operably connected thereto. Lower layers of OA&M interface 1460 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1440, core network interface 1450, and OA&M interface 1460 may be multiplexed together on a single physical interface, such as the examples listed above.

Figure 15:
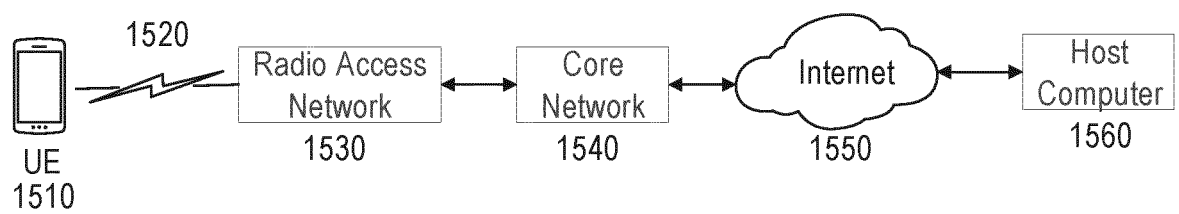
FIG. 15 is a block diagram of an exemplary network configured to provide over-the-top (OTT) data services between a host computer and a UE, according to various exemplary embodiments of the present disclosure.

FIG. 15 is a block diagram of an exemplary communication network configured to provide over-the-top (OTT) data services between a host computer and a user equipment (UE), according to one or more exemplary embodiments of the present disclosure. UE 1510 can communicate with radio access network (RAN) 1530 over radio interface 1520, which can be based on protocols described above including, e.g., LTE, LTE-A, and 5G/NR. For example, UE 1510 can be configured and/or arranged as shown in other figures discussed above.

RAN 1530 can include one or more terrestrial network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4-GHz band and/or a 5-GHz band. In such cases, the network nodes comprising RAN 1530 can cooperatively operate using licensed and unlicensed spectrum. In some embodiments, RAN 1530 can include, or be capable of communication with, one or more satellites comprising a satellite access network.

RAN 1530 can further communicate with core network 1540 according to various protocols and interfaces described above. For example, one or more apparatus (e.g., base stations, eNBs, gNBs, etc.) comprising RAN 1530 can communicate to core network 1540 via core network interface 1650 described above. In some exemplary embodiments, RAN 1530 and core network 1540 can be configured and/or arranged as shown in other figures discussed above. For example, eNBs comprising an E-UTRAN 1530 can communicate with an EPC core network 1540 via an S1 interface, such as shown in FIG. 1. As another example, gNBs comprising a NR RAN 1530 can communicate with a 5GC core network 1530 via an NG interface.

Core network 1540 can further communicate with an external packet data network, illustrated in FIG. 15 as Internet 1550, according to various protocols and interfaces known to persons of ordinary skill in the art. Many other devices and/or networks can also connect to and communicate via Internet 1550, such as exemplary host computer 1560. In some exemplary embodiments, host computer 1560 can communicate with UE 1510 using Internet 1550, core network 1540, and RAN 1530 as intermediaries. Host computer 1560 can be a server (e.g., an application server) under ownership and/or control of a service provider. Host computer 1560 can be operated by the OTT service provider or by another entity on the service provider's behalf.

For example, host computer 1560 can provide an over-the-top (OTT) packet data service to UE 1510 using facilities of core network 1540 and RAN 1530, which can be unaware of the routing of an outgoing/incoming communication to/from host computer 1560. Similarly, host computer 1560 can be unaware of routing of a transmission from the host computer to the UE, e.g., the routing of the transmission through RAN 1530. Various OTT services can be provided using the exemplary configuration shown in FIG. 15 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 15 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

Exemplary embodiments described herein provide flexible and efficient techniques for transmitting and receiving downlink (DL) data messages comprising a plurality of transport blocks (TB) by configuring UEs (e.g., UE 1510) and network nodes (e.g., nodes in RAN 1530) to operate correctly and consistently in relation to a physical data channel (e.g., PDSCH) in a cell. By scaling and/or adjusting the LBRM threshold based on a function of the maximum number of DL transmission layers supported by the UE in the cell, such embodiments accommodate UE complexity and decoding constraints while minimizing and/or reducing network scheduler restrictions, especially when UE supports and is configured more than four DL transmission layers in the cell. When used in NR UEs (e.g., UE 1510) and gNBs (e.g., gNBs comprising RAN 1530), exemplary embodiments described herein can provide various improvements, benefits, and/or advantages that facilitate data services (e.g., eMBB) used to deliver large amounts of data to a UE. As a consequence, this improves the performance of these services as experienced by OTT service providers and end-users, including more consistent data throughout and lower latency without excessive UE power consumption or other reductions in user experience.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

Example embodiments of the techniques and apparatus described herein include, but are not limited to, the following enumerated examples:

1. A method, performed by a user equipment (UE) operating in a cell of a wireless communication network, for receiving a downlink (DL) data message comprising a plurality of transport blocks (TB), the method comprising:
   receiving scheduling indication of the DL data message;
   determining a limited-buffer rate-matching (LBRM) threshold based on a maximum number of transmission layers supported by the UE for the cell;
   determining whether the size of the DL data message is greater than the LBRM threshold; and
   based on determining that the size of the DL data message is not greater than the LBRM threshold, receiving and decoding the plurality of TBs.

2. The method of embodiment 1, further comprising receiving scheduling indication of the DL data message, wherein the size of the DL data message is determined based on the scheduling information.

3. The method of any of embodiments 1-2, wherein receiving and decoding the plurality of TBs comprises:
   receiving a first TB via one or more first transmission layers;
   receiving a second TB via one or more second transmission layers; and
   decoding the respective first and second TBs.

4. The method of any of embodiments 1-3, further comprising, based on determining that the size of the DL data message is greater than the LBRM threshold, refraining from receiving and decoding the plurality of TBs.

5. The method of any of embodiments 1-4, wherein determining the LBRM threshold is based on a function of the maximum number of transmission layers (X) supported by the UE for the serving cell.

6. The method of any of embodiments 1-5, wherein determining the LBRM threshold is further based on an LBRM code rate ($R_{LBRM}$) and an LBRM transport block size ($TBS_{LBRM}$).

7. The method of embodiment 6, further comprising receiving and decoding the plurality of TBs based on $R_{LBRM}$ and $TBS_{LBRM}$.

8. The method of any of embodiments 6-7, wherein the LBRM threshold is determined according to Q times $TBS_{LBRM}$ divided by $R_{LBRM}$, where Q is determined based on the function of X.

9. The method of embodiment 8, wherein Q is determined based on one of the following functions: max (1, X/4), ceil(X/4).

10. The method of embodiment 9, wherein Q is determined based on a lookup table relating a plurality of values of X to respective values of Q.

11. A method, performed by a network node serving a cell in a wireless communication network, for transmitting a downlink (DL) data message comprising a plurality of transport blocks (TB), the method comprising:
   determining a limited-buffer rate-matching (LBRM) threshold for a user equipment (UE) served by the cell, based on a maximum number of transmission layers supported by the UE in the cell;
   determining whether the size of a DL data message, for the UE, is greater than the LBRM threshold, wherein the DL data message includes a plurality of transport blocks (TB); and
   based on determining that the size of the DL data message is greater than the LBRM threshold, encoding and transmitting the DL data message based on an LBRM code rate ($R_{LBRM}$) and an LBRM transport block size ($TBS_{LBRM}$).

12. The method of embodiment 11, further comprising transmitting, to the UE, a scheduling indication of the DL data message.

13. The method of any of embodiments 11-12, wherein encoding and transmitting the DL data message comprises:
   encoding and transmitting a first TB via one or more first transmission layers; and
   encoding and transmitting a second TB via one or more second transmission layers.

14. The method of any of embodiments 11-13, wherein determining the LBRM threshold is based on a function of the maximum number of transmission layers (X) supported by the UE for the serving cell.

15. The method of any of embodiments 11-14, wherein determining the LBRM threshold is further based on the LBRM code rate ($R_{LBRM}$) and the LBRM transport block size ($TBS_{LBRM}$).

16. The method of embodiment 15, wherein the LBRM threshold is determined according to Q times $TBS_{LBRM}$ divided by $R_{LBRM}$, where Q is determined based on the function of X.

17. The method of embodiment 16, wherein Q is determined based on one of the following functions: max(1, X/4), ceil(X/4).

18. The method of embodiment 16, wherein Q is determined based on a lookup table relating a plurality of values of X to respective values of Q.

19. A user equipment (UE) configured to receive a downlink (DL) data message comprising a plurality of transport blocks (TB), the UE comprising:
   communication circuitry configured to communicate with a network node serving a cell in a wireless communication network; and
   processing circuitry operatively associated with the communication circuitry and configured to perform operations corresponding to the methods of any of embodiments 1-10.

20. A user equipment (UE) configured to receive a downlink (DL) data message comprising a plurality of transport blocks (TB), the UE being arranged to perform operations corresponding to the methods of any of embodiments 1-10.

21. A non-transitory, computer-readable medium storing computer-executable instructions that, when executed by at least one processor of a user equipment (UE), configure the UE to perform operations corresponding to the methods of any of embodiments 1-10.

22. A network node configured to transmit, in a cell of a wireless communication network, a downlink (DL) data message comprising a plurality of transport blocks (TB), the network node comprising:
   communication circuitry configured to communicate with the UEs; and
   processing circuitry operatively associated with the communication circuitry and configured to perform operations corresponding to the methods of any of embodiments 11-18.

23. A network node configured to transmit, in a cell of a wireless communication network, a downlink (DL) data message comprising a plurality of transport blocks (TB), the network node being arranged to perform operations corresponding to the methods of any of embodiments 10-18.

24. A non-transitory, computer-readable medium storing computer-executable instructions that, when executed by at least one processor comprising a network node, configure the network node to perform operations corresponding to the methods of any of embodiments 10-18.

The invention claimed is:

1. A method performed by a user equipment (UE) for receiving a physical downlink shared channel (PDSCH) transmission from a serving cell in a wireless network, the method comprising:
   receiving a PDSCH transmission from the serving cell on an active bandwidth part (BWP);
   decoding a plurality of transport blocks (TBs) partially or fully contained within a duration of a plurality of consecutive symbols ending at a last symbol of the PDSCH transmission, when a limited-buffer rate-matching (LBRM) condition is not satisfied, wherein the LBRM condition is:

$$2^{max(0,\mu-\mu')} \cdot \sum_{i \in S} \left\lfloor \frac{C'_i}{L_i} \right\rfloor x_i . F_i > \text{ceil}\left(\frac{X}{4}\right) \cdot \frac{1}{R_{LBRM}} . TBS_{LBRM}$$

where: $R_{LBRM}=2/3$, $TBS_{LBRM}$ is an LBRM transport block size and X is a maximum number of transmission layers associated with the UE for the serving cell;

S is a set of all TBs scheduled for the UE on physical downlink shared channels (PDSCHs) that are at least partially included in the plurality of consecutive symbols, and i is an index to an i-th TB within S;

$C'_i$ is a number of scheduled code blocks for the i-th TB;

$L_i$ is a number of orthogonal frequency-division multiplexing (OFDM) symbols assigned to the PDSCH for the i-th TB;

$x_i$ is a number of OFDM symbols of the PDSCH that are included in the plurality of consecutive symbols;

$$F_i = \max_{j=0,\ldots,J-1} \left( \min\left(k_{0,i}^j + E_i^j, N_{cb,i}\right) \right),$$

where $k_{0,i}^j$ is the starting location of a redundancy version (RV) for the jth transmission, $E_i^j=\min(E_r)$ of the scheduled code blocks for the jth transmission, where $E_r$ is a rate matching output sequence length for the r-th coded block, $N_{cb,i}$ is a circular buffer length;

μ corresponds to a subcarrier spacing of an active bandwidth part (BWP); and

μ' corresponds to the subcarrier spacing of a configured BWP having the largest number of configured physical resource blocks; and wherein X is greater than four.

2. The method of claim 1, wherein decoding the plurality of TBs comprises:
receiving a first TB via one or more first transmission layers;
receiving a second TB via one or more second transmission layers; and
decoding the respective first and second TBs.

3. The method of claim 1, further comprising refraining from decoding the plurality of TBs when the LBRM condition is satisfied.

4. The method of claim 1, wherein the plurality of TBs are received and decoded based on $R_{LBRM}$ and $TBS_{LBRM}$.

5. The method of claim 1, wherein the plurality of TBs constitute all TBs scheduled for the UE by the wireless network in the serving cell during the plurality of consecutive symbols.

6. The method of claim 1, wherein X is given by:
a higher-layer parameter maxMIMO-Layers of the serving cell, when the higher-layer parameter has been configured for the UE by the wireless network; and
the maximum number of layers for physical downlink shared channel (PDSCH) supported by the UE for the serving cell, when the higher-layer parameter has not been configured for the UE by the wireless network.

7. The method of claim 1, wherein the plurality of consecutive symbols is 14 consecutive symbols for normal cyclic prefix (CP) and 12 consecutive symbols for extended CP.

8. The method of claim 1, further comprising determining that the LBRM condition is not satisfied for the duration of the plurality of consecutive symbols ending at the last symbol of the PDSCH transmission.

9. The method of claim 1, wherein $$2^{max(0,\mu-\mu')} \cdot \sum_{i \in S} \left\lfloor \frac{C'_i}{L_i} \right\rfloor x_i . F_i$$

is greater than $$\frac{1}{R_{LMRM}} . TBS_{LBRM}$$

10. The method of claim 1, further comprising determining that the LBRM condition is satisfied for the duration of the plurality of consecutive symbols ending at the last symbol of the PDSCH transmission.

11. The method of claim 10, comprising refraining from decoding the plurality of TBs when it is determined that the LBRM condition is satisfied.

12. A method performed by a network node for a serving cell in a wireless network for transmitting a physical downlink shared channel (PDSCH) transmission to a user equipment (UE), the method comprising:
transmitting, to the UE, a plurality of transport blocks (TBs) partially or fully contained within a duration of a plurality of consecutive symbols ending at a last symbol of a PDSCH transmission, when a limited-buffer rate-matching (LBRM) condition is not satisfied, wherein the LBRM condition is:

$$2^{max(0,\mu-\mu')} \cdot \sum_{i \in S} \left\lfloor \frac{C'_i}{L_i} \right\rfloor x_i . F_i > \text{ceil}\left(\frac{X}{4}\right) \cdot \frac{1}{R_{LBRM}} . TBS_{LBRM}$$

where: $R_{LBRM}=2/3$, $TBS_{LBRM}$ is an LBRM transport block size and X is a maximum number of transmission layers associated with the UE for the serving cell;

S is a set of all TBs scheduled for the UE on physical downlink shared channels (PDSCHs) that are at least partially included in the plurality of consecutive symbols, and i is an index to an i-th TB within S;

$C'_i$ is a number of scheduled code blocks for the i-th TB;

$L_i$ is a number of orthogonal frequency-division multiplexing (OFDM) symbols assigned to the PDSCH for the i-th TB;

$x_i$ is a number of OFDM symbols of the PDSCH that are included in the plurality of consecutive symbols;

$$F_i = \max_{j=0,\ldots,J-1} \left( \min\left(k_{0,i}^j + E_i^j, N_{cb,i}\right) \right),$$

where $k_{0,i}^j$ is the starting location of a redundancy version (RV) for the jth transmission, $E_i^j=\min(E_r)$ of the scheduled code blocks for the jth transmission, where $E_r$ is a rate matching output sequence length for the r-th coded block, $N_{cb,i}$ is a circular buffer length;

μ corresponds to a subcarrier spacing of an active bandwidth part (BWP); and

μ' corresponds to the subcarrier spacing of a configured BWP having the largest number of configured physical resource blocks; and wherein X is greater than four.

13. The method of claim 12, wherein transmitting the plurality of TBs comprises determining sizes of the plurality of TBs such that the LBRM condition is not satisfied.

14. The method of claim 12, wherein transmitting the plurality of TBs comprises:
  encoding and transmitting a first TB via one or more first transmission layers; and
  encoding and transmitting a second TB via one or more second transmission layers.

15. The method of claim 12, wherein the plurality of TBs are encoded and transmitted based on $R_{LBRM}$ and $TBS_{LBRM}$.

16. The method of claim 12, wherein X is given by:
  a higher-layer parameter maxMIMO-Layers of the serving cell, when the higher-layer parameter has been configured in the UE by the wireless network; and
  the maximum number of layers for physical downlink shared channel (PDSCH) supported by the UE for the serving cell, when the higher-layer parameter has not been configured in the UE by the wireless network.

17. The method of claim 12 comprising transmitting a PDSCH transmission to the user equipment on an active bandwidth part (BWP).

18. The method of claim 12, comprising determining that the LBRM condition is not satisfied for the duration of the plurality of consecutive symbols ending at the last symbol of the PDSCH transmission.

19. The method of claim 12, wherein $$2^{max(0,\mu-\mu')} \cdot \sum_{i \in S} \left\lfloor \frac{C'_i}{L_i} \right\rfloor x_i . F_i$$

is greater than $$\frac{1}{R_{LMRM}} . TBS_{LBRM}$$

20. A user equipment (UE) configured to receive a physical downlink shared channel (PDSCH) from a serving cell in a wireless network, the UE comprising:
  radio transceiver circuitry configured to communicate with a network node in the wireless network; and
  processing circuitry operatively coupled to the radio transceiver circuitry, whereby the processing circuitry and the radio transceiver circuitry are configured to:
    receive a PDSCH transmission from the serving cell on an active bandwidth part (BWP);
    decode a plurality of transport blocks (TBs) partially or fully contained within a duration of a plurality of consecutive symbols ending at a last symbol of the PDSCH transmission, when a limited-buffer rate-matching (LBRM) condition is not satisfied, wherein the LBRM condition is:

$$2^{max(0,\mu-\mu')} \cdot \sum_{i \in S} \left\lfloor \frac{C'_i}{L_i} \right\rfloor x_i . F_i > \text{ceil}\left(\frac{X}{4}\right) \cdot \frac{1}{R_{LBRM}} . TBS_{LBRM}$$

where: $R_{LBRM}=2/3$, $TBS_{LBRM}$ is an LBRM transport block size and X is a maximum number of transmission layers associated with the UE for the serving cell;
  S is a set of all TBs scheduled for the UE on physical downlink shared channels (PDSCHs) that are at least partially included in the plurality of consecutive symbols, and i is an index to an i-th TB within S;
  $C_i'$ is a number of scheduled code blocks for the i-th TB;
  $L_i$ is a number of orthogonal frequency-division multiplexing (OFDM) symbols assigned to the PDSCH for the i-th TB;
  $x_i$ is a number of OFDM symbols of the PDSCH that are included in the plurality of consecutive symbols;

$$F_i = \max_{j=0,\ldots,J-1} \left(\min\left(k_{0,i}^j + E_i^j, N_{cb,i}\right)\right),$$

where $k_{0,i}^j$ is the starting location of a redundancy version (RV) for the jth transmission, $E_i^j = \min(E_r)$ of the scheduled code blocks for the jth transmission, where $E_r$ is a rate matching output sequence length for the r-th coded block, $N_{cb,i}$ is a circular buffer length;
    μ corresponds to a subcarrier spacing of an active bandwidth part (BWP); and
    μ' corresponds to the subcarrier spacing of a configured BWP having the largest number of configured physical resource blocks; and
  wherein X is greater than four.

21. A network node configured for transmitting a physical downlink shared channel (PDSCH) to a user equipment (UE) in a cell of a wireless network, the network node comprising:
  radio network interface circuitry configured to communicate with the UE; and
  processing circuitry operatively coupled to the radio network interface circuitry, whereby the processing circuitry and the radio network interface circuitry are configured to:
    transmit, to the UE, a plurality of transport blocks (TBs) partially or fully contained within a duration of a plurality of consecutive symbols ending at a last symbol of a PDSCH transmission, when a limited-buffer rate-matching (LBRM) condition is not satisfied, wherein the LBRM condition is:

$$2^{max(0,\mu-\mu')} \cdot \sum_{i \in S} \left\lfloor \frac{C'_i}{L_i} \right\rfloor x_i . F_i > \text{ceil}\left(\frac{X}{4}\right) \cdot \frac{1}{R_{LBRM}} . TBS_{LBRM}$$

where: $R_{LBRM}=2/3$, $TBS_{LBRM}$ is an LBRM transport block size and X is a maximum number of transmission layers associated with the UE for the serving cell;
  S is a set of all TBs scheduled for the UE on physical downlink shared channels (PDSCHs) that are at least partially included in the plurality of consecutive symbols, and i is an index to an i-th TB within S;
  $C_i'$ is a number of scheduled code blocks for the i-th TB;
  $L_i$ is a number of orthogonal frequency-division multiplexing (OFDM) symbols assigned to the PDSCH for the i-th TB;
  $x_i$ is a number of OFDM symbols of the PDSCH that are included in the plurality of consecutive symbols;

$$F_i = \max_{j=0,\ldots,J-1} \left(\min\left(k_{0,i}^j + E_i^j, N_{cb,i}\right)\right),$$

where $k_{0,i}^j$ is the starting location of a redundancy version (RV) for the jth transmission, $E_i^j = \min(E_r)$ of the scheduled code blocks for the jth transmission, where $E_r$ is a rate matching output sequence length for the r-th coded block, $N_{cb,i}$ is a circular buffer length;

μ corresponds to a subcarrier spacing of an active bandwidth part (BWP); and

μ' corresponds to the subcarrier spacing of a configured BWP having the largest number of configured physical resource blocks; and wherein X is greater than four.

* * * * *